US012176130B2

(12) United States Patent
Rao et al.

(10) Patent No.: US 12,176,130 B2
(45) Date of Patent: Dec. 24, 2024

(54) SYSTEMS AND RESISTORS FOR DYNAMIC BRAKING

(71) Applicant: Transportation IP Holdings, LLC, Norwalk, CT (US)

(72) Inventors: Sudeep Pradhan Sadananda Rao, Bangalore (IN); Jaime Garcia, Lawrence Park, PA (US); Mahantesh Hosur, Bangalore (IN); Jeffrey John Wolff, Erie, PA (US); Laura Cooper, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 46 days.

(21) Appl. No.: 17/582,827

(22) Filed: Jan. 24, 2022

(65) Prior Publication Data

US 2022/0148766 A1 May 12, 2022

Related U.S. Application Data

(60) Continuation-in-part of application No. 16/856,503, filed on Apr. 23, 2020, now Pat. No. 11,239,008.
(Continued)

(51) Int. Cl.
*H01C 1/08* (2006.01)
*B60L 7/06* (2006.01)
(Continued)

(52) U.S. Cl.
CPC ............... *H01C 1/08* (2013.01); *B60L 7/06* (2013.01); *H01C 7/00* (2013.01); *H01C 13/02* (2013.01);
(Continued)

(58) Field of Classification Search
CPC . H01C 1/08; H01C 7/00; H01C 13/02; H01C 17/00; B60L 7/06
See application file for complete search history.

(56) References Cited

U.S. PATENT DOCUMENTS 3,274,374 A  9/1966  Matheson et al.
3,420,985 A * 1/1969  Brew ................. H05B 3/00
                                              219/549
(Continued)

FOREIGN PATENT DOCUMENTS

WO  0154221 A1  7/2001

OTHER PUBLICATIONS

Research Gate, AM EB Fabricated Ti 6A1 4V Complex Functional Mesh/Mesh and Mesh/Foam Bone Shaft Stem, Web-page article, 4 pages.
(Continued)

Primary Examiner — Kyung S Lee
(74) Attorney, Agent, or Firm — K&L Gates LLP

(57) ABSTRACT

A resistor includes an elongated cylindrical body having nodes and elongated members. The elongated members interconnect the nodes to form openings between the nodes and the elongated members for the flow therethrough of a cooling fluid. The body is configured to receive electric current from a powered system and to conduct and provide electric resistance to the electric current to dissipate at least part of the electric current as heat from the body. The body may be coupled with at least one other resistor of the powered system in one or more of a parallel or series arrangement in an electric circuit.

20 Claims, 19 Drawing Sheets

Related U.S. Application Data which is a division of application No. 16/193,717, filed on Nov. 16, 2018, now Pat. No. 10,665,369.

(51) Int. Cl.
*B61H 11/00* (2006.01)
*H01C 7/00* (2006.01)
*H01C 13/02* (2006.01)
*H01C 17/00* (2006.01)

(52) U.S. Cl.
CPC .......... *H01C 17/00* (2013.01); *B60L 2200/26* (2013.01); *B61H 11/00* (2013.01)

(56) References Cited

U.S. PATENT DOCUMENTS

| | | | |
|---|---|---|---|
| 4,238,636 A | 12/1980 | Burstrom | |
| 5,304,978 A | 4/1994 | Cummins et al. | |
| 5,396,214 A * | 3/1995 | Kumar | B60L 3/00 338/279 |
| 5,877,674 A | 3/1999 | Berger, II | |
| 6,366,201 B1 | 4/2002 | Hanisko | |
| 6,924,726 B2 * | 8/2005 | Ekwall | H05B 3/24 338/319 |
| 7,262,571 B2 | 8/2007 | Nelson et al. | |
| 7,538,641 B2 | 5/2009 | Puente Baliarda et al. | |
| 8,692,647 B2 | 4/2014 | Bailey et al. | |
| 9,815,374 B2 * | 11/2017 | Widmer | B60L 7/02 |
| 10,391,868 B2 | 8/2019 | Karipidis et al. | |
| 10,665,369 B1 * | 5/2020 | Rao | H01C 17/00 |
| 11,211,186 B2 * | 12/2021 | Rao | B60L 7/10 |
| 11,239,008 B2 * | 2/2022 | Rao | B60T 13/586 |
| 2002/0074210 A1 | 6/2002 | Brandle et al. | |
| 2002/0140615 A1 | 10/2002 | Carles et al. | |
| 2004/0103694 A1 | 6/2004 | Bang | |
| 2005/0174081 A1 * | 8/2005 | Nguyen | H02P 3/12 318/376 |
| 2008/0080137 A1 | 4/2008 | Otsuki et al. | |
| 2008/0150459 A1 | 6/2008 | Alexander et al. | |
| 2009/0293760 A1 * | 12/2009 | Kumar | B60L 7/10 318/471 |
| 2012/0080883 A1 * | 4/2012 | Hobdy | H02K 35/02 290/53 |
| 2013/0154523 A1 * | 6/2013 | Brown | B60L 7/22 318/380 |
| 2019/0021186 A1 | 1/2019 | Poltorak | |

OTHER PUBLICATIONS

Bornoff, Posts Tagged Fractal, blogs.mentor.com/, 11 pages.

* cited by examiner

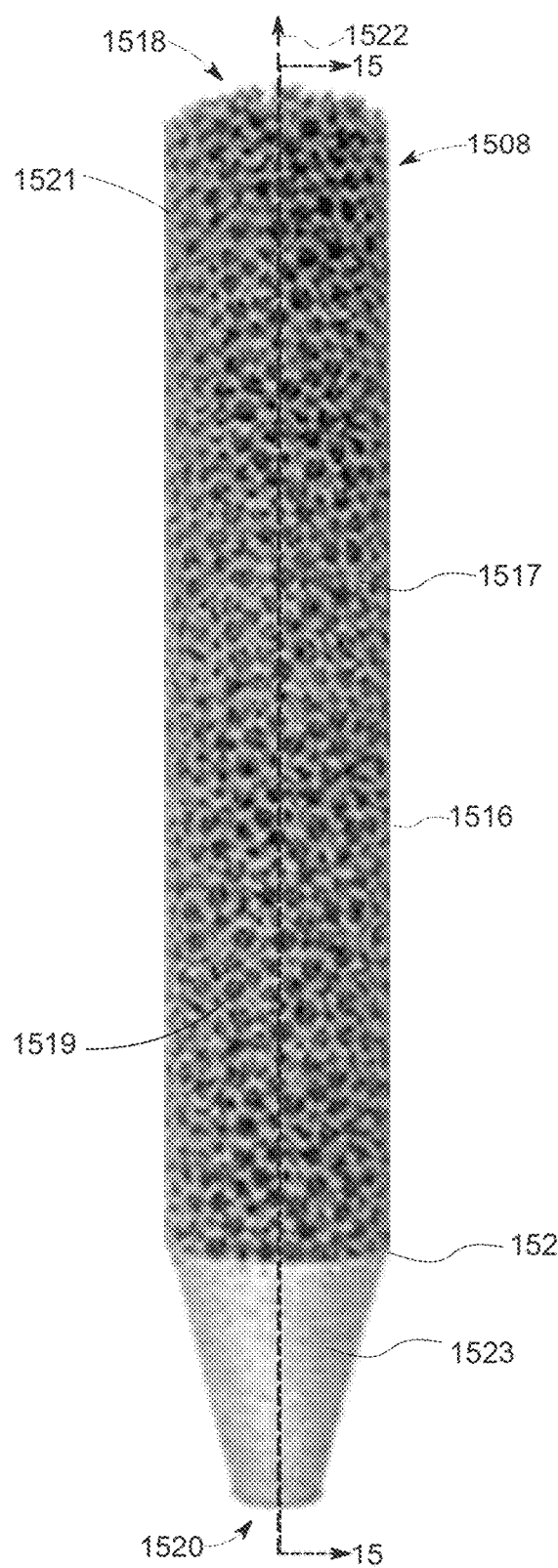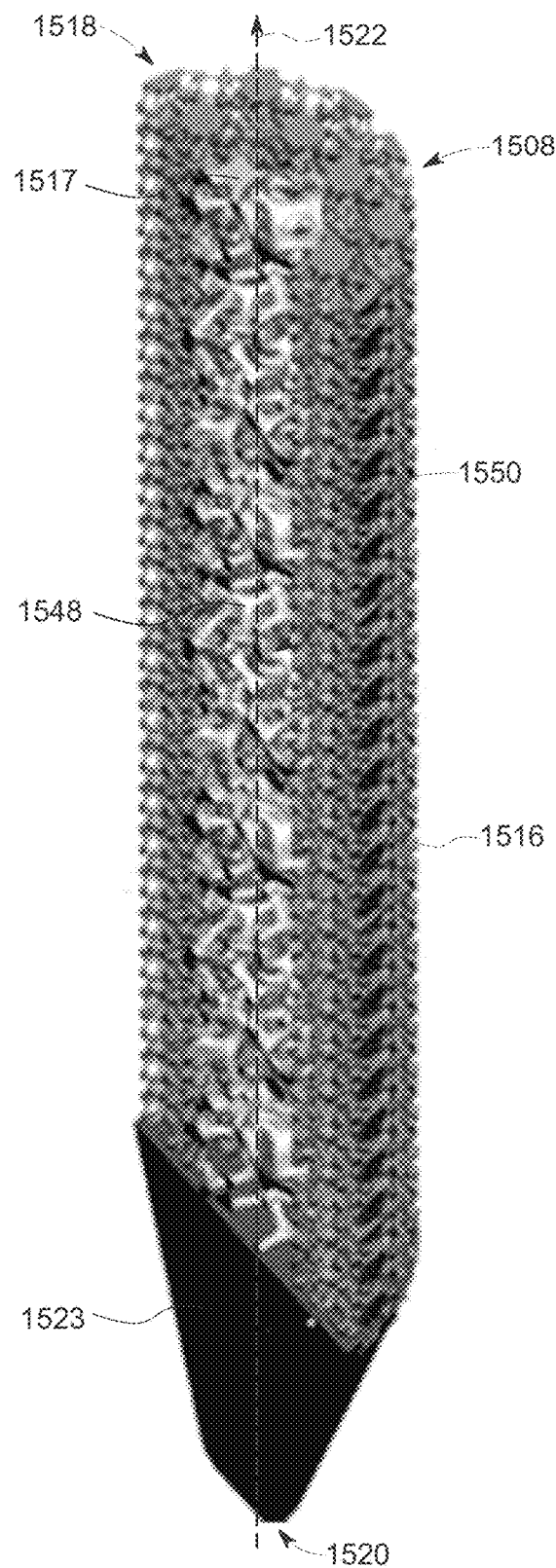
FIG. 14
FIG. 15

SYSTEMS AND RESISTORS FOR DYNAMIC BRAKING

CROSS-REFERENCE TO RELATED APPLICATIONS

This application is a continuation-in-part of U.S. patent application Ser. No. 16/856,503, filed on 23 Apr. 2020, which is a divisional of U.S. patent application Ser. No. 16/193,717, filed on 16 Nov. 2018 and issued as U.S. Pat. No. 10,665,369. The entire disclosures of both applications are incorporated herein by reference.

BACKGROUND

Technical Field

The subject matter described herein relates to electrical resistors, such as resistors that can be used to dissipate electric current as heat.

Some powered systems may use resistors for a variety of purposes. Some braking systems generate electric current during operation. For example, regenerative or dynamic braking systems may create electric current during braking. This current may be conducted to a grid of resistors conductively connected with each other. The resistors dissipate the electric current as heat. Blowers (e.g., fans) may be used to cool the resistors and carry the heat generated by the resistors away from the resistor grid. Some stationary power-generating systems may use resistors in the transmission of current between locations.

Some known resistors may be limited in how much heat the resistors can dissipate. The resistors usually are manufactured as planar or flat plates to increase the exposure of the surface area of the resistors to the ambient environment. This helps to cool the resistors by carrying heat from the surfaces of the resistors that is generated as electric current is conducted through the resistors. It may be desirable to have a system and method that differs from those that are currently available.

Brief Description

In one or more embodiments, a resistor is provided that includes an elongated cylindrical body having nodes and elongated members. The elongated members interconnect the nodes to form openings between the nodes and the elongated members for the flow therethrough of a cooling fluid. The body may receive electric current from a powered system and to conduct and provide electric resistance to the electric current to dissipate at least part of the electric current as heat from the body. The body also may be coupled with at least one other resistor of the powered system in one or more of a parallel or series arrangement in an electric circuit.

In one or more embodiments, a method for manufacturing a resistor is provided that includes successively applying layers of material on each other. Each of the layers forms a cross-sectional shape of a three-dimensional resistor body. The method also includes fusing adjacent layers of the layers that are successively applied with each other to form the resistor body. The adjacent layers are fused together to form the resistor body that has an elongated cylindrical shape. The adjacent layers are fused together to form the resistor body that is shaped to receive and dissipate electric current from a powered system as heat from the resistor body. The resistor body is shaped to be coupled with at least one other resistor of the powered system in one or more of a parallel or series arrangement in an electric circuit.

In one or more embodiments, a resistor is provided that includes an elongated cylindrical body that extends along a center axis from a first terminal end to an opposite, second terminal end. The body has elongated members interconnected to one another at nodes and forms openings between the nodes and the elongated members for flow therethrough of a cooling fluid. The body forms a continuous electrically conductive path that extends from the first terminal end to the second terminal end. The body may receive electric current at the first terminal end from a powered system and to conduct and provide electric resistance to the electric current to dissipate at least part of the electric current as heat from the body. The second terminal end of the body may be coupled with at least one other resistor of the powered system in one or more of a parallel or series arrangement in an electric circuit.

BRIEF DESCRIPTION OF THE DRAWINGS

The inventive subject matter may be understood from reading the following description of non-limiting embodiments, with reference to the attached drawings, wherein below:

FIG. 14 illustrates one example of an elongated cylindrical resistor having different pore densities;

FIG. 15 illustrates a cross-sectional view of the resistor shown in FIG. 15;

DETAILED DESCRIPTION

Figure 1:
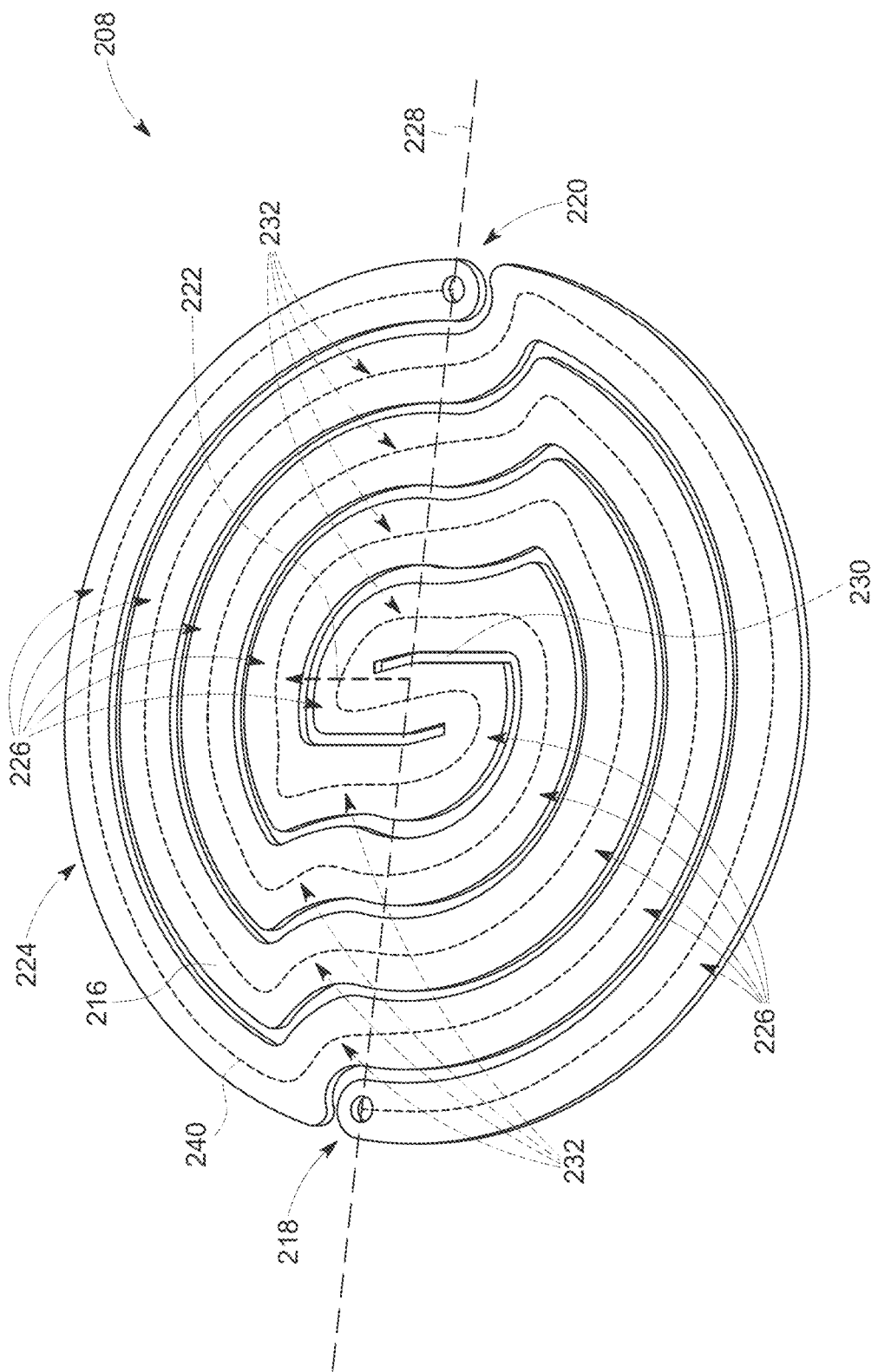
FIG. 1 illustrates one example of an asymmetric disc-shaped resistor.

One or more embodiments of the inventive subject matter described herein provide a resistor system. A suitable resistor system may have a relatively increased capacity for dissipating heat. In one embodiment, the resistor system may have a relatively increased surface areas of the resistors. An increased surface area can allow for the resistors to conduct and dissipate a relatively increased amount of current from a powered system. Suitable powered systems may include a braking system or power-generating system.

At least some of the resistors described herein may be additively manufactured. Suitable additive manufacturing techniques may use direct metal laser sintering of powder beds, direct metal laser melting of powder beds, powder fed or binder jetting or atomic diffusion, fused deposition modeling or selective laser sintering or electron beam melting, wire fed printing, sheet lamination 3D printing, cold-spray-based 3D printing, or a combination of the above additive manufacturing technologies. Optionally, a combination of subtractive substrate manufacturing with additive manufacturing deposition can be used to make the complex shapes of the resistors described herein. Suitable resistors can be manufactured from ceramic materials, metal, or metal alloy materials, alone or in combination with organic or in-organic binders or materials. In one embodiment, a suitable metal alloy may be a nickel alloy or super alloy. In on embodiment, the metal may be INCONEL718/625, for example. Selection of the material may be made with reference to the material properties, the manufacturing technique, and the end use parameters. In one embodiment, the resistor body is a monolithic structure, having no seams or welds, while defining other features, such as fins, holes, apertures, and channels.

Suitable resistors can be designed for higher surface area per given volume and for customized air flows through and/or around the resistors using one or more motorized fans or blowers. The designs of at least some of the additively manufactured resistors described herein can be more effectively cooled than currently known solid planar resistors with the same air flow. In some embodiments, this may increase the useful life of the resistors and increase the reliability of the resistors with reduced weight and space savings of the resistors relative to known resistors.

The resistors described herein can be connected with each other in a circuit that conducts current through at least some of the resistors. The resistors can be connected with each other in a series and/or in a parallel arrangement. For example, some resistors can be connected in series with each other, some resistors can be connected in parallel with each other, and some series of resistors can be connected in parallel with each other. The parallel connection of the resistors can allow for electric current to continue passing through some resistors if other resistors fail or the connections to those resistors break.

One example of an assembly in which the resistors described herein can be used is a resistor grid of a powered system. The resistor grid includes several resistor modules that each includes several grid resistors electrically connected in series with each other. A blower is oriented toward the resistors in each module with a diffuser disposed between each blower and the resistors in the same module. The blower forces air through the diffuser, which diffuses the air over the resistors to cool and dissipate heat given off by the resistors. This air is a cooling fluid used to cool the resistors. As described herein, the resistors can generate heat as current is conducted through the resistors from a powered system, such as a braking system, a power-generating system (e.g., a turbine), or the like. In other embodiments, the resistors can be connected to the powered system in another way, such as by one or more cables. The resistors may be placed in a conductive path along which the powered system conducts current, such as to one or more loads to power the loads. While air is one cooling fluid that may pass over and/or through the resistors to cool the resistors, optionally, another type of cooling fluid can be used. For example, the cooling fluid can be water, oil, nitrogen, or the like.

FIG. 1 illustrates one example of a resistor 208. The resistor is formed from an elongated body 216 that extends from a first terminal end 218 to an opposite (e.g., second) terminal end 220. The body is a continuous body from the first terminal end to the opposite terminal end, without gaps, breaks, or the like, in the body. In other embodiments, the body can be formed from two or more segments that are joined together. The body can be formed from a resistive material that resists the conduction of current from the first terminal end to the opposite terminal end, but that is at least partially conductive to current from the first terminal end to the opposite terminal end. The first terminal end and/or the opposite terminal end can be conductively coupled with a powered system, another resistor, and/or another element in a circuit. In other embodiments, the opposite terminal end can be conductively coupled with the powered system, another resistor, and/or another element in a circuit.

The body is formed along a tortuous path 240 from the first terminal end to the opposite terminal end. The path formed by the body is a continuous, non-intersecting path from the first terminal end to the opposite terminal end. The path is non-intersecting in that the body never crosses over itself. As shown, the body is arranged in the path to form a disc shaped object having a center axis 222. This disc can be flat or have a flat cross-section. For example, the disc formed by the body can be substantially larger (e.g., at least ten times larger) along two different, orthogonal directions in the same two-dimensional plane than along a third orthogonal direction. The ends are located radially outside of most of the body (e.g., closer to an outer edge 224 of the disc), as shown in FIG. 1. In other embodiments, one or more of the ends can be closer to the center axis 222 than the outer edge.

The path formed by the body form several concentric arcs 226 around the center axis 222. The arcs are formed on opposite sides of a midsection line 228 of the body. This midsection line linearly extends from one first terminal end to the other opposite terminal end of the body. In the illustrated embodiment, the body forms a disc shape that is asymmetric about or on opposite sides of the midsection line. In other embodiments, the body may form a disc shape that is symmetric about or on opposite sides of the midsection line.

The arcs on each side of the midsection line are different sizes in the illustrated embodiment. For example, the outermost arc (e.g., the arc that is the largest radial distance from the center axis 222) of the arcs on one side of the midsection line is the largest arc of the arcs on that same side of the midsection line, the next outermost arc (e.g., the arc that is the second largest radial distance from the center axis 222) of the arcs on one side of the midsection line is the second largest of the arcs on that same side of the midsection line, and so on. The arcs are larger or smaller based on the length of the segment of the body that forms each of the arcs. In the illustrated embodiment, the path formed by the body includes the arcs coupled by connecting segments 232 of the body that extend between the arcs. In the illustrated embodiment, the connecting segments of the body cross over or intersect the midsection line. One of the connecting segments (e.g., the connecting segment that couples the shortest length arcs) intersects the center axis due to the center axis extending through this connecting segment. Optionally, this connecting segment can include an opening, hole, or gap through which the center axis extends.

Different segments of the path formed by the body are spatially spaced apart from each other by a gap 230. For example, the neighboring arcs are spaced apart and separate from each other by different portions of the gap. The gap is a single, continuous spatial separation that extends in a spiral path around the center axis, similar to the spiral path formed by the body. In other embodiments, the gap may be formed by two or more gaps that are separated from each other by the body.

The gap allows for a cooling fluid, such as air, to pass between the arcs of the body and at least partially pass through the disc shape formed by the body. This can help to more rapidly and more effectively cool the body. For example, the same mass, flow, or mass flow rate of a cooling fluid directed toward the resistor in directions along and/or parallel to the center axis may be able to more rapidly cool, may cool the resistor by a greater amount, and/or may prevent a larger increase in temperature of the resistor relative to the same mass, flow, or mass flow rate of the same cooling fluid directed toward a resistor formed of the same material but in the shape of a planar plate.

Figure 2:
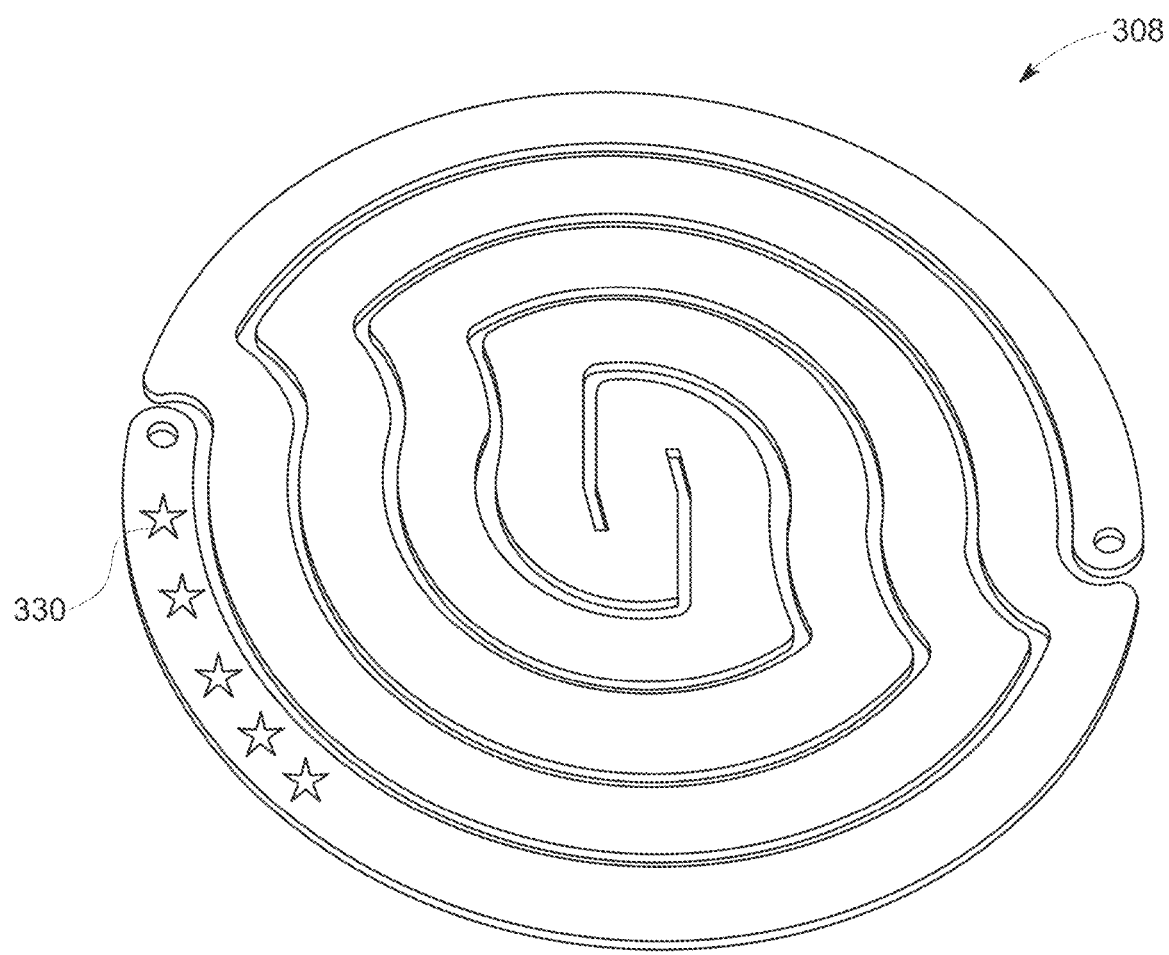
FIG. 2 illustrates another example of an asymmetric disc-shaped resistor with cooling holes.

FIG. 2 illustrates another example of a resistor 308. The resistor 308 can be similar to the resistor, with one difference being the presence of cooling holes 330 formed through the body of the resistor in one or more locations. The cooling holes 330 can provide additional spaces for the cooling fluid to pass through the body of the resistor, which can increase the cooling of the resistor relative to the resistor that does not include the cooling holes. While the cooling holes are shown in only a small part of one arc of the resistor, In other embodiments, the cooling holes may be positioned in more arcs or along more of the length of the body forming the resistor. Additionally, the shape of the cooling holes in other embodiments may differ from what is shown in FIG. 2.

Figure 3:
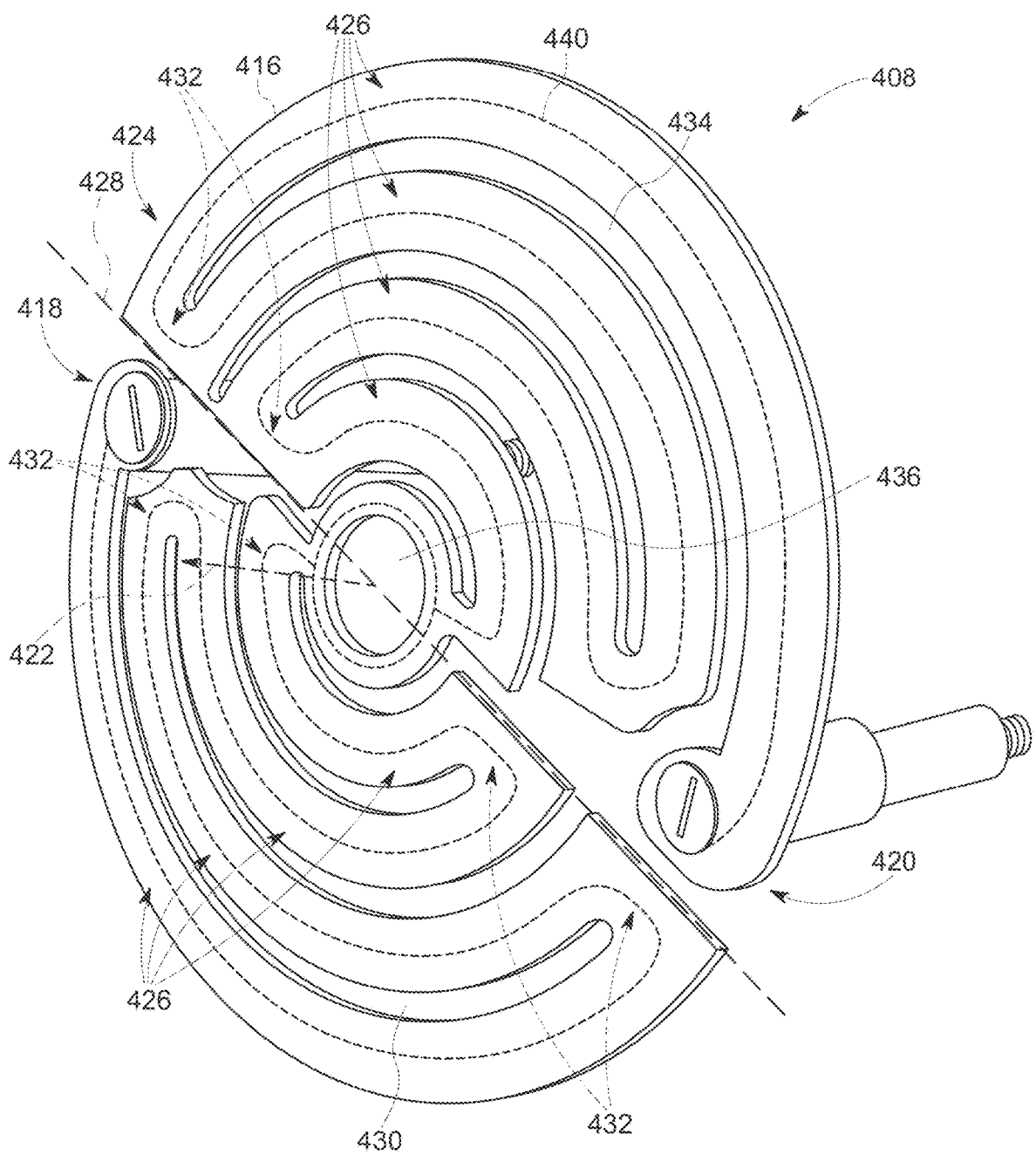
FIG. 3 illustrates another example of an asymmetric disc-shaped resistor with a center cooling hole.

FIG. 3 illustrates another example of a resistor 408. The resistor is formed from an elongated body 416 that extends from a first terminal end 418 to an opposite terminal end 420. The body is a continuous body from the terminal end to the opposite end, without gaps, breaks, or the like, in the body. In other embodiments, the body can be formed from two or more separate segments that are joined together.

The body can be formed from a resistive material that resists the conduction of current from the first end to the second end, but that is at least partially conductive to current from the terminal end to the opposite end. The terminal end and/or the opposite end can be conductively coupled with a powered system, another resistor, and/or another element in a circuit. The body is formed along a tortuous, non-intersecting path 440 from the terminal end to the opposite end. The body may be continuous from the terminal end to the opposite end, or optionally can be formed from two or more separate segments that are joined together. The illustrated body is arranged in the path to form a disc-shaped object having a center axis 422. This disc can be flat or have a flat cross-section. The ends are located radially outside of most of the body (e.g., closer to an outer edge 424 of the disc). In other embodiments, one or more of the ends can be closer to the center axis than the outer edge.

The path formed by the body has several concentric arcs 426 around the center axis 422. The arcs are formed on opposite sides of a midsection line 428 of the body. In the illustrated embodiment, the ends are on opposing sides of the midsection line 428, but alternatively one or both of the ends can be on the line or on the same side of the line. In the illustrated embodiment, the body forms a disc shape that is asymmetric about or on opposite sides of the midsection line 428. In other embodiments, the body has a disc shape that is symmetric about or on opposite sides of the midsection line 428. The arcs on each side of the midsection line are different sizes. For example, the arcs that are closer to the outer edge are larger than the arcs that are closer to the center axis.

The body includes several connecting segments 432 that extend between the arcs 426. In the illustrated embodiment, the connecting segments do not cross over or intersect the midsection line 428. For example, the connecting segments include bends between the arcs connected by each connecting segment. Due to these bends, the path formed by the body wraps or bends back and forth along opposite circumferential directions of the disc-shaped resistor on each side of the opposite halves of the resistor (that are on opposite sides of the midsection line).

Different segments of the path formed by the body are spatially spaced apart from each other by gaps 430, 434, 436. The gaps may allow for a cooling fluid, such as air, to pass between the arcs of the body and at least partially pass through the disc shape formed by the body. For example, one gap 430 can allow the cooling fluid to pass between the arcs on one side of the midsection line 428, another gap 434 can allow the cooling fluid to pass between the arcs on the opposite side of the midsection line 428, and another gap 436 can allow the cooling fluid to pass between the joined arcs that create a circle or other annulus extending around the center axis 422. These gaps can help to more rapidly and more effectively cool the body, as described above.

Figure 4:
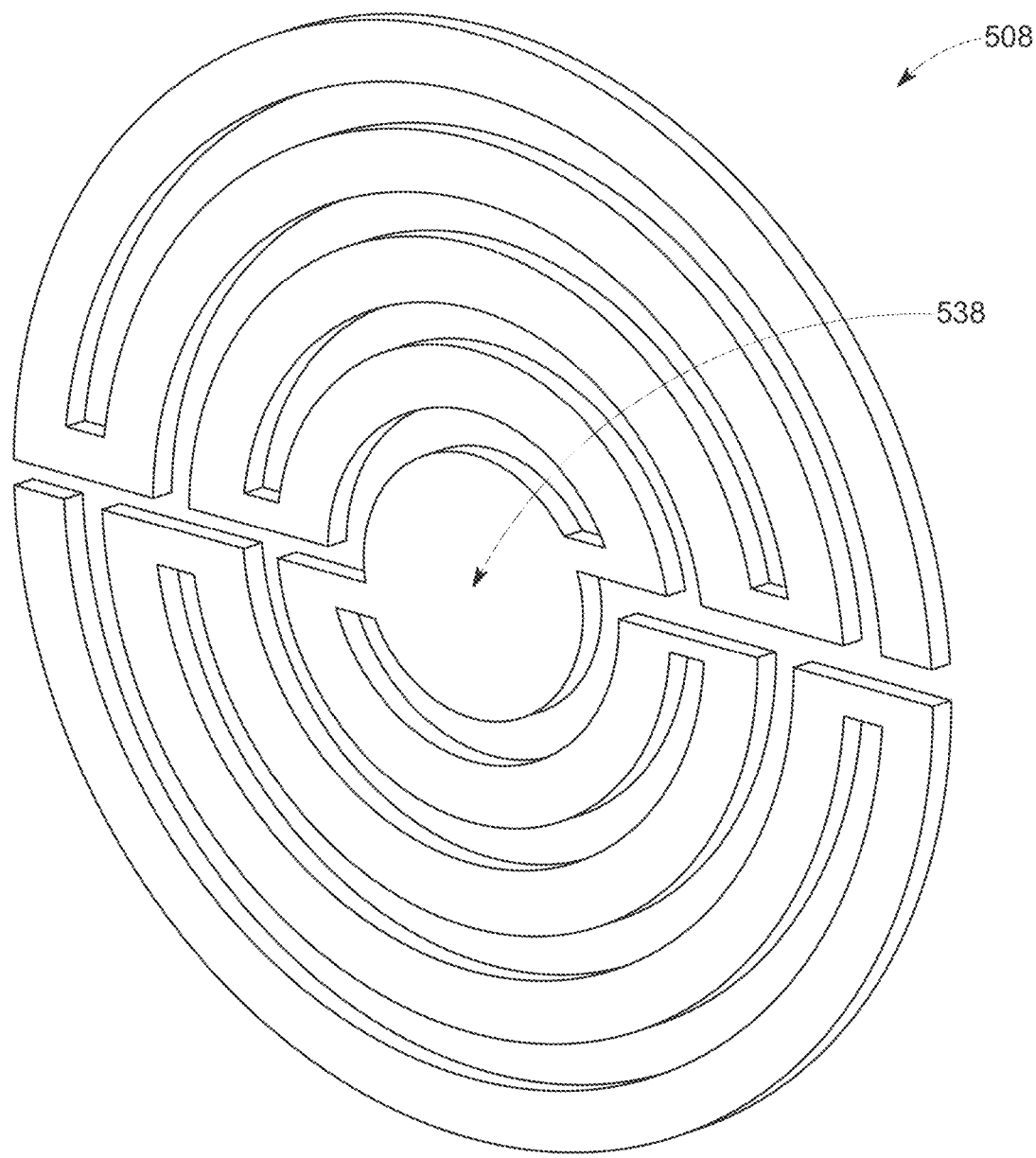
FIG. 4 illustrates another example of an asymmetric disc-shaped resistor with a center plate and formed from a planar body.

FIG. 4 illustrates another example of a resistor 508. The resistor is similar to the resistor shown in FIG. 3 in that the resistor is formed from an elongated body extending between opposite terminal ends along a tortuous, non-intersecting path. The paths formed by the bodies of the resistors may be the same, with one difference being the absence of the gap in the resistor of FIG. 4. As shown in FIG. 4, the resistor includes a center plate 538 through which the center axis 222 extends instead of the gap.

Figure 5:
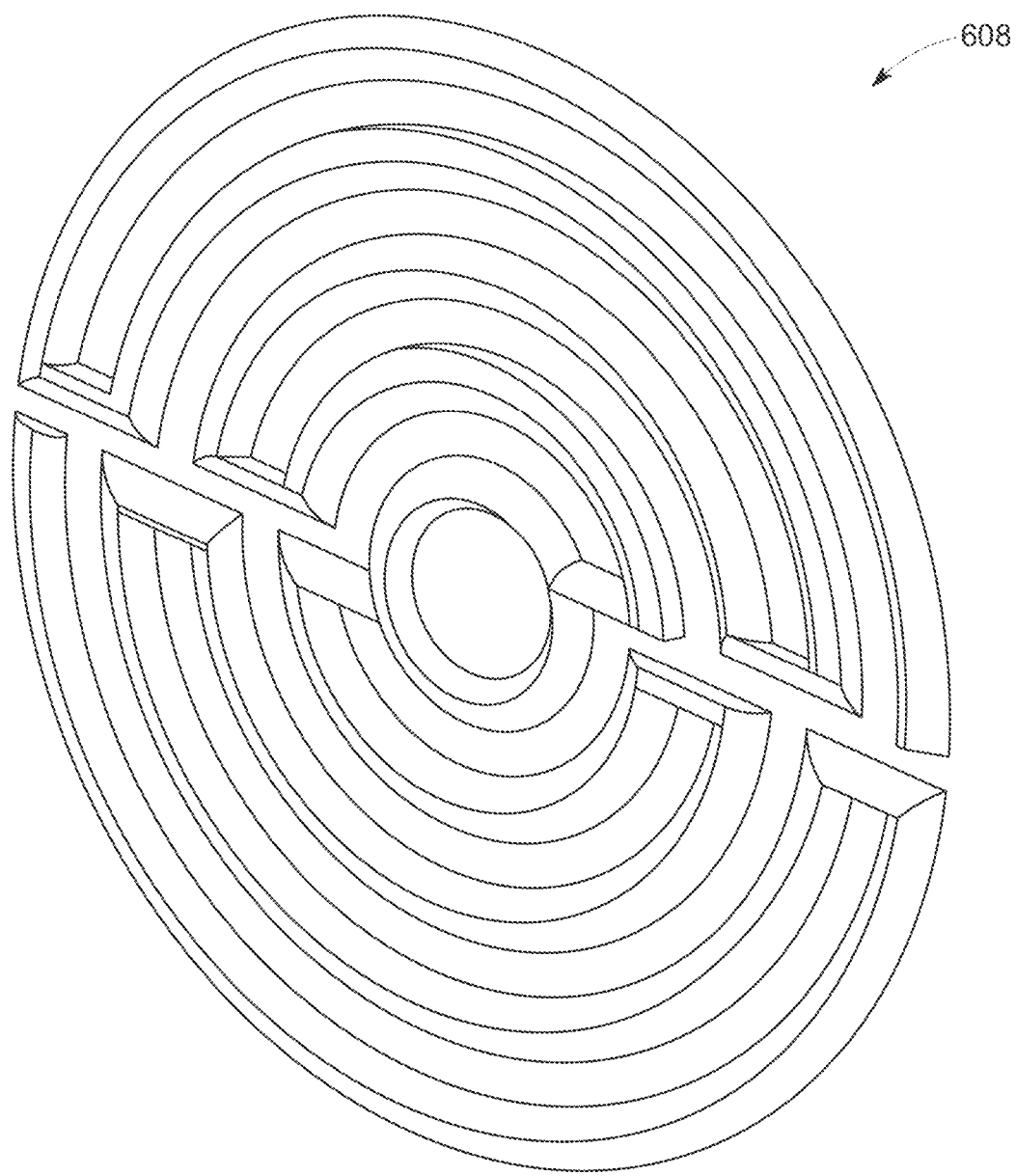
FIG. 5 illustrates another example of an asymmetric disc-shaped resistor with a center plate and formed from a semi-circular body.

FIG. 5 illustrates another example of a resistor 608. The resistor is similar to the resistor shown in FIG. 3 in that the resistor is formed from an elongated body extending between opposite terminal ends along a tortuous, non-intersecting path. The paths formed by the bodies of the resistors may be the same, with one difference being the cross-sectional shapes of the bodies forming the resistors. As shown in FIGS. 3 and 5, the cross-sectional shape of the body of the resistor is a planar, square, or rectangular shape, while the cross-sectional shape of the body of the resistor is a semi-circular shape. In other embodiments, the cross-sectional shape of the body of the resistor may be a circular or oval shape, as described in more detail below. The semi-circular, circular, or oval cross-sectional shape can be referred to as a curved cross-sectional shape, while the planar, square, or rectangular cross-sectional shape can be referred to as a polygon cross-sectional shape. The curved cross-sectional shape of one or more of the bodies forming the resistors described herein can provide for increased surface area per unit length relative to the polygon cross-sectional shapes described herein. As the surface area of the resistor increases, the rate at which heat is dissipated from the resistor also can increase as more of the resistor is exposed to the cooling fluid.

Figure 6:
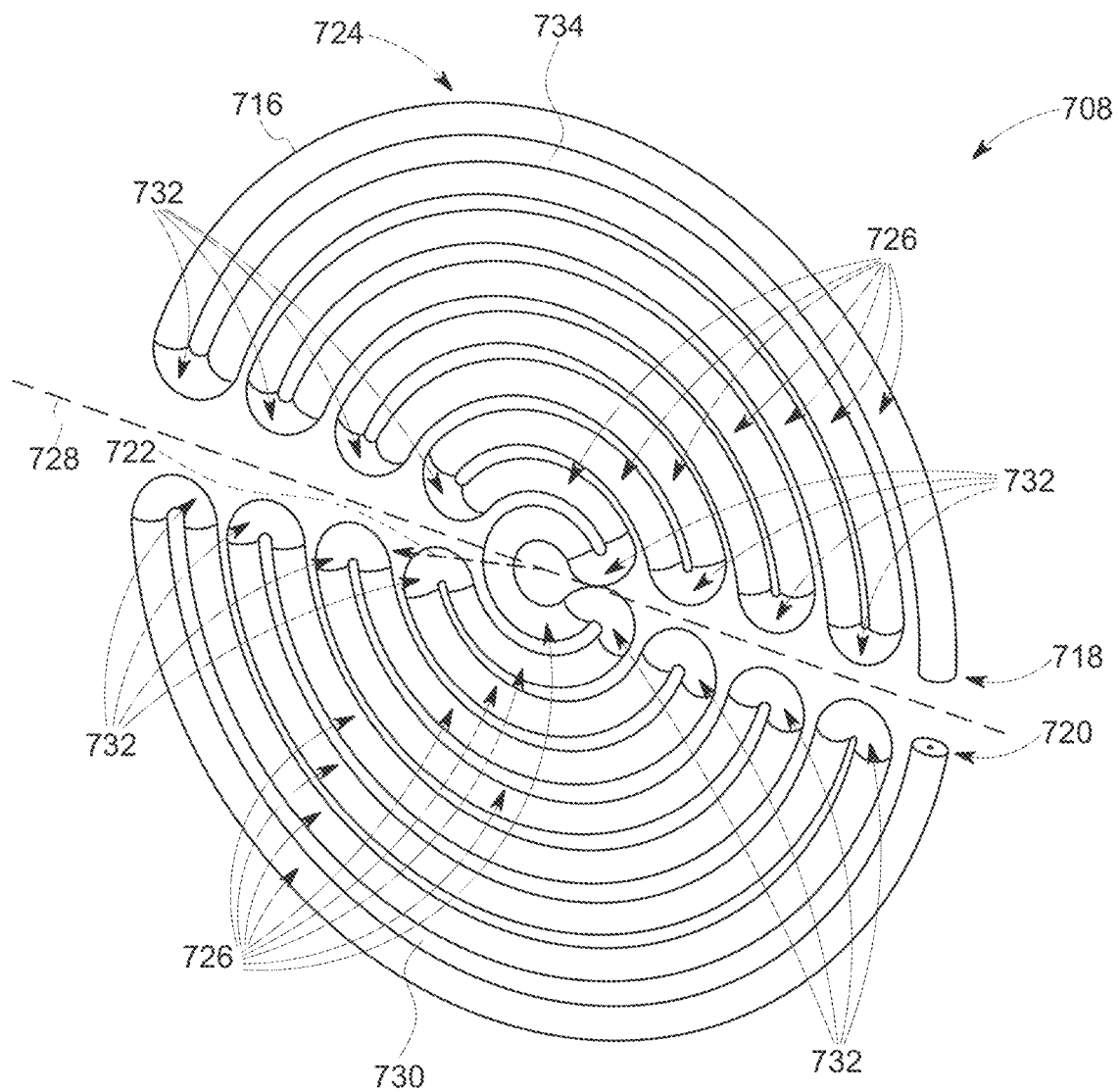
FIG. 6 illustrates another example of a symmetric disc-shaped resistor with a round body.

FIG. 6 illustrates another example of a resistor 708. The resistor is similar to the resistors shown in the other Figures in that the resistor is formed from an elongated body 716 extending between opposite terminal ends 718, 720, with the body forming a disc-shaped resistor and extending along a tortuous, non-intersecting path from one end 718 to the other end 720.

The body is a continuous body from the one end to the other end without gaps, breaks, or the like, in the body. In other embodiments, the body can be formed from two or more separate segments that are joined together. The body can be formed from a resistive material that resists the conduction of current from the one end to the other end, but that is at least partially conductive to current from the one end to the other end. The one end and/or the other end can be conductively coupled with the powered system, another resistor, and/or another element in a circuit. The body has a circular cross-sectional shape, but alternatively may have another curved cross-sectional shape or may have a polygon cross-sectional shape.

The body is formed along a tortuous, non-intersecting path from the one end to the other end. The body may be continuous from the one end to the other end, or optionally can be formed from two or more separate segments that are joined together. The body is arranged in the path to form a disc-shaped object having a center axis 722. The ends are located radially outside of most of the body (e.g., closer to an outer edge 724 of the disc). In other embodiments, one or more of the ends can be closer to the center axis 722 than the outer edge 724.

The path formed by the body has several concentric arcs 726 around the center axis 722. The arcs are formed on opposite sides of a midsection line 728 of the body. In the illustrated embodiment, the ends are on opposite sides of the midsection line 728 and face each other across the midsection line 728. In other embodiments, one or both of the ends can be on the line 728 or can contact each other (e.g., such that the body does not include the ends but forms a completely continuous looping body). The arcs on each side of the midsection line are different sizes. For example, the arcs that are closer to the outer edge are larger than the arcs that are closer to the center axis 722.

The body includes several connecting segments 732 that connect the arcs. In the illustrated embodiment, the connecting segments do not cross over or intersect the midsection line 728. The connecting segments are curved bends between the arcs that are connected by each connecting segment 732. Due to these bends, the path formed by the body wraps or bends back and forth along opposite circumferential directions of the disc-shaped resistor 708 on each side of the opposite halves of the illustrated resistor (that are on opposite sides of the midsection line 728). In contrast to other resistors, the body forms a disc shape that is symmetric about or on opposite sides of the midsection line 428. In other embodiments, the body may form a disc shape that is asymmetric about or on opposite sides of the midsection line 728.

Different segments of the path formed by the body are spatially spaced apart from each other by gaps. The gaps allow for a cooling fluid, such as air, to pass between the arcs of the body and at least partially pass through the disc shape formed by the body. These gaps can help to more rapidly and more effectively cool the body, as described above.

Figure 7:
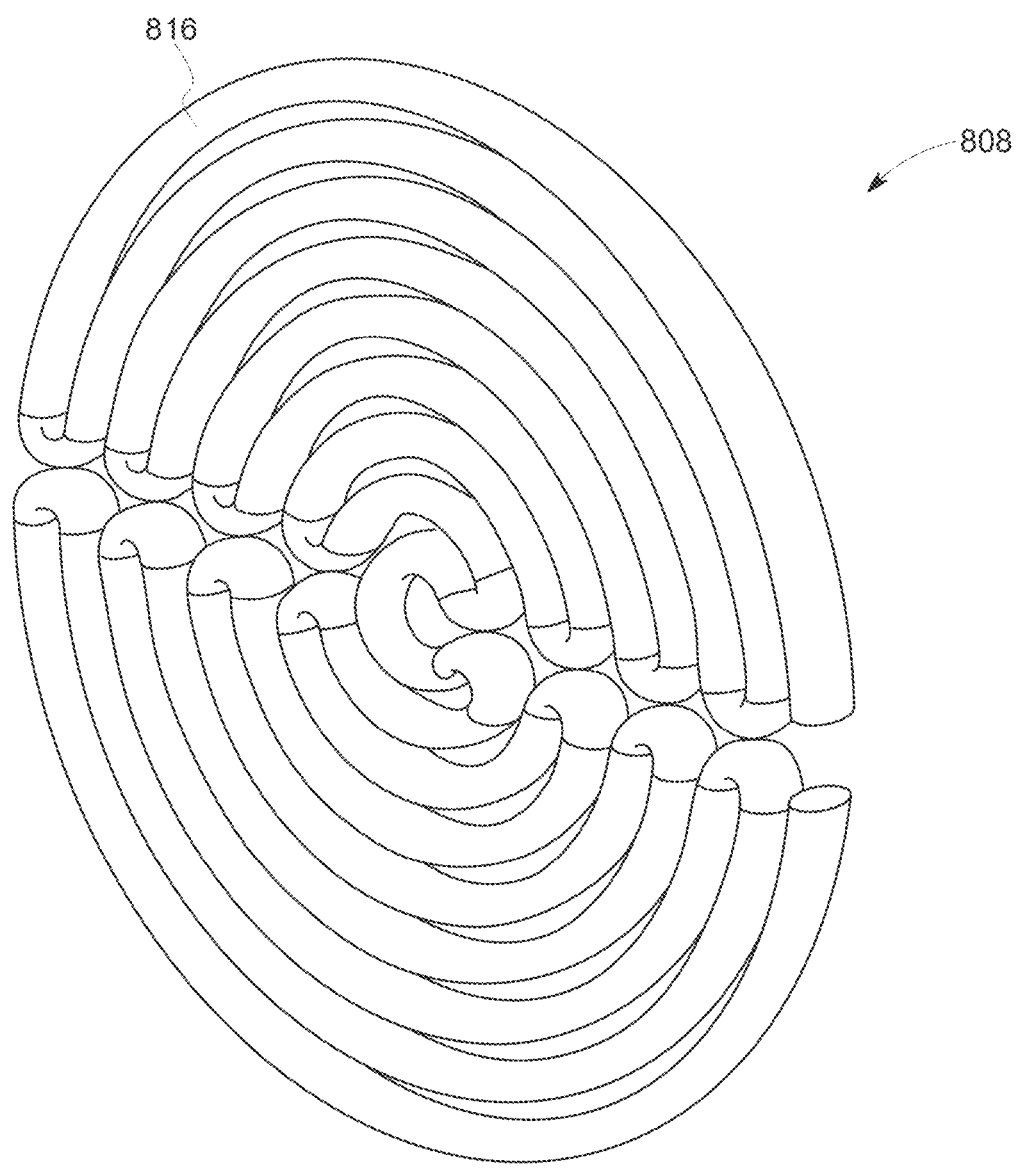
FIG. 7 illustrates another example of a symmetric disc-shaped resistor with an oval body.

FIG. 7 illustrates another example of a resistor 808. The resistor 808 is similar to the resistor shown in other Figures except for the cross-sectional shape of bodies 716, 816 forming the resistors. In FIG. 6, the body of the resistor is shown as having a circular cross-sectional shape. The body of the resistor 808 shown in FIG. 7 has an oval or elliptical cross-sectional shape. The cross-sectional shape of the body of the resistor can increase the cross-sectional area per unit length of the resistor relative to the resistor. As described herein, increasing the cross-sectional area of the resistor can increase the cooling of the resistor and increase the rate at which heat is dissipated from the resistor relative to the resistor.

Figure 8:
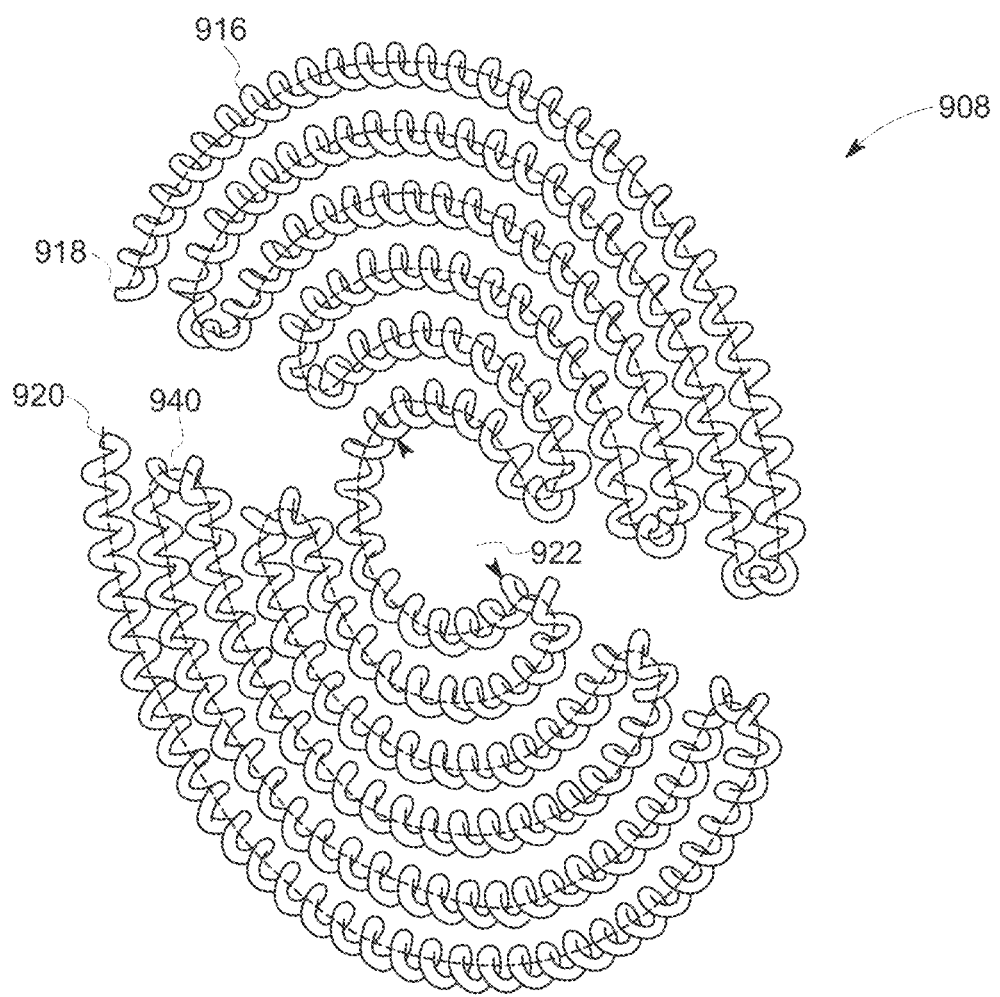
FIG. 8 illustrates another example of a symmetric disc-shaped resistor with a helically wrapped body.

FIG. 8 illustrates another example of a resistor 908. The resistor is shaped similar to the resistors shown in earlier Figures except for the path of a body 916 of the resistor. The body of the resistor has a smaller cross-sectional area than the bodies of the resistors. But, the body of the resistor helically wraps around the spiral path of the disc shape of the resistor. Stated differently, the resistor spirals along a path 940 that at least partially encircles the center axis 922 of the resistor. The body of the resistor helically wraps around this path 940 from one terminal end 918 of the body to an opposite terminal end 920 of the body. The body of the resistor may have a significantly greater total length from one terminal end to the other terminal end than the bodies that do not helically wrap around the path of the corresponding resistor. This increased length of the body can increase the surface area per unit length of the resistor relative to other resistors that do not have a helically wound body.

The resistors shown in FIGS. 1 through 8 are generally disc-shaped resistors that may be oriented to face the directions in which the blowers direct air. For example, the center axes of the resistors shown in FIGS. 1 through 8 may be oriented toward the blowers so that the cooling fluid directed by the blowers is directed toward one side of the resistors. This can increase how much of the surface areas of the resistors contacts the cooling fluid in contrast to another orientation of the resistors. In other embodiments, the resistors may be oriented in another direction or may have a different general shape. Other suitable shapes may include a polygonal shape, a star-shape, and the like.

Figure 9:
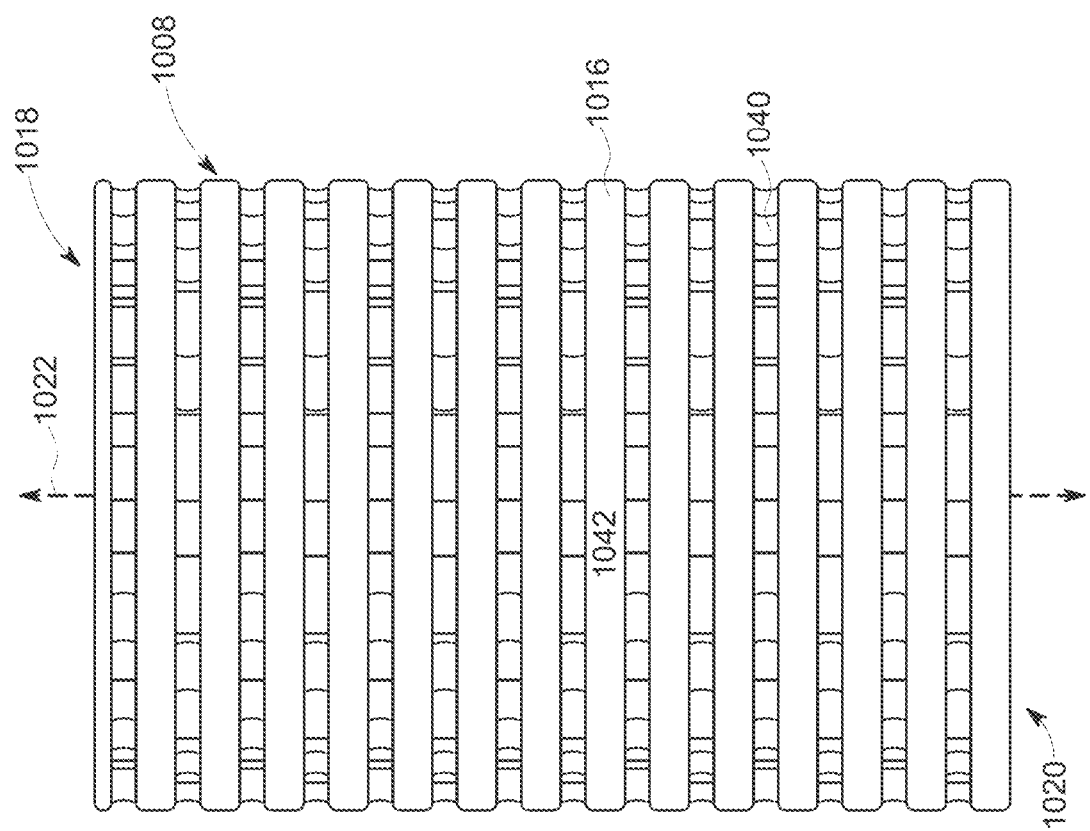
FIG. 9 illustrates another example of cylindrical resistors.
Figure 9:
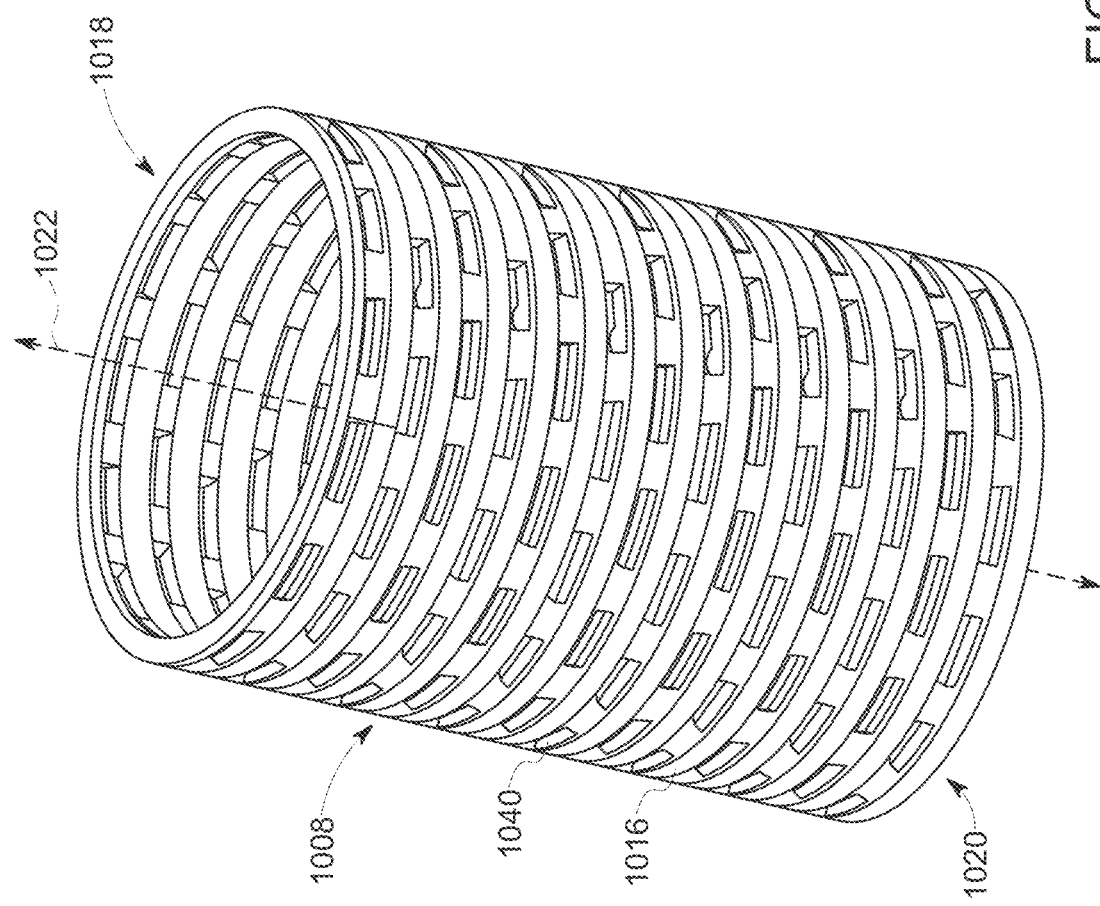
Figure 10:
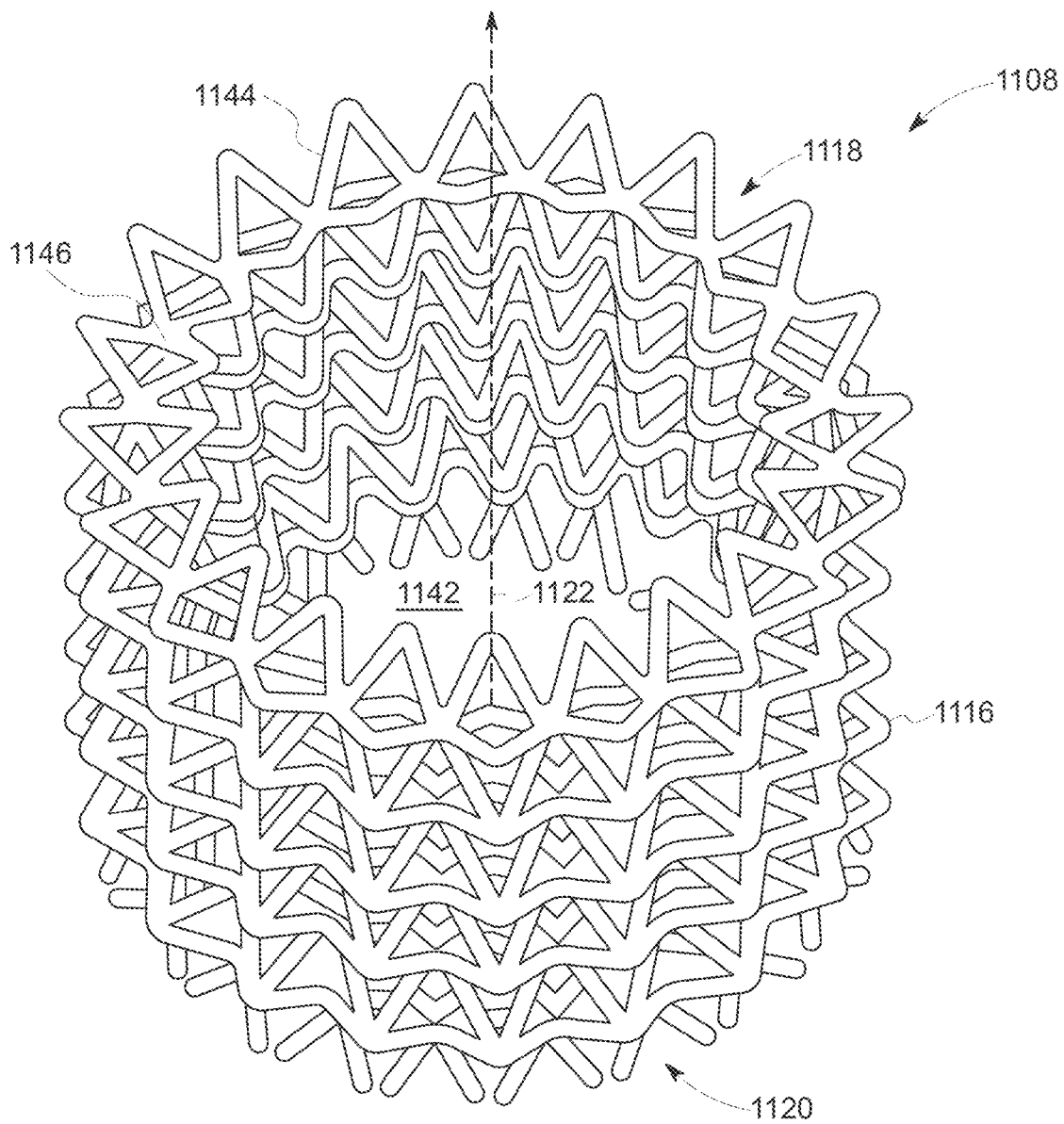
FIG. 10 illustrates one example of a fractal lattice resistor.
Figure 11:
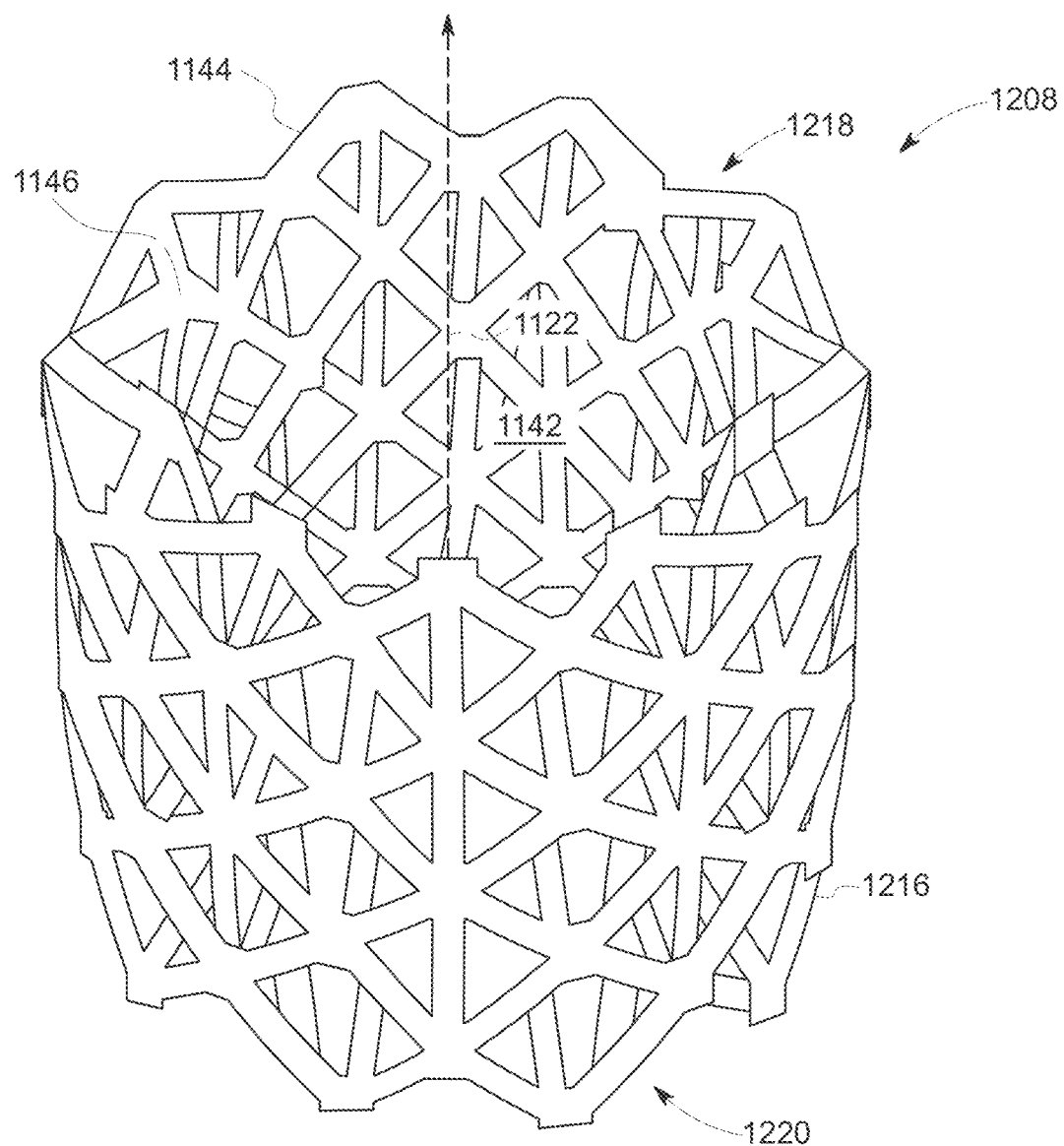
FIG. 11 illustrates another example of a fractal lattice resistor.
Figure 12:
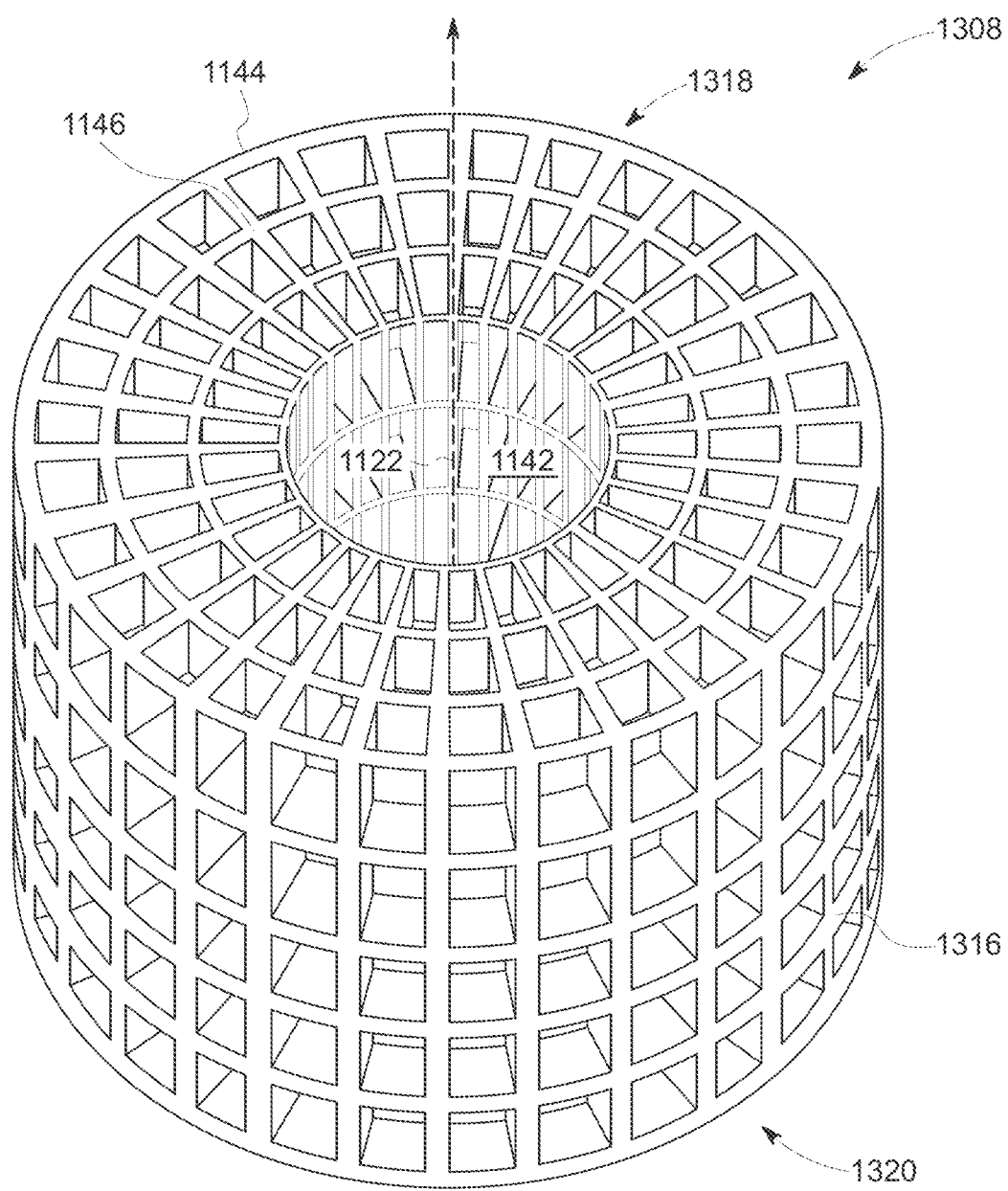
FIG. 12 illustrates another example of a fractal lattice resistor.
Figure 13:
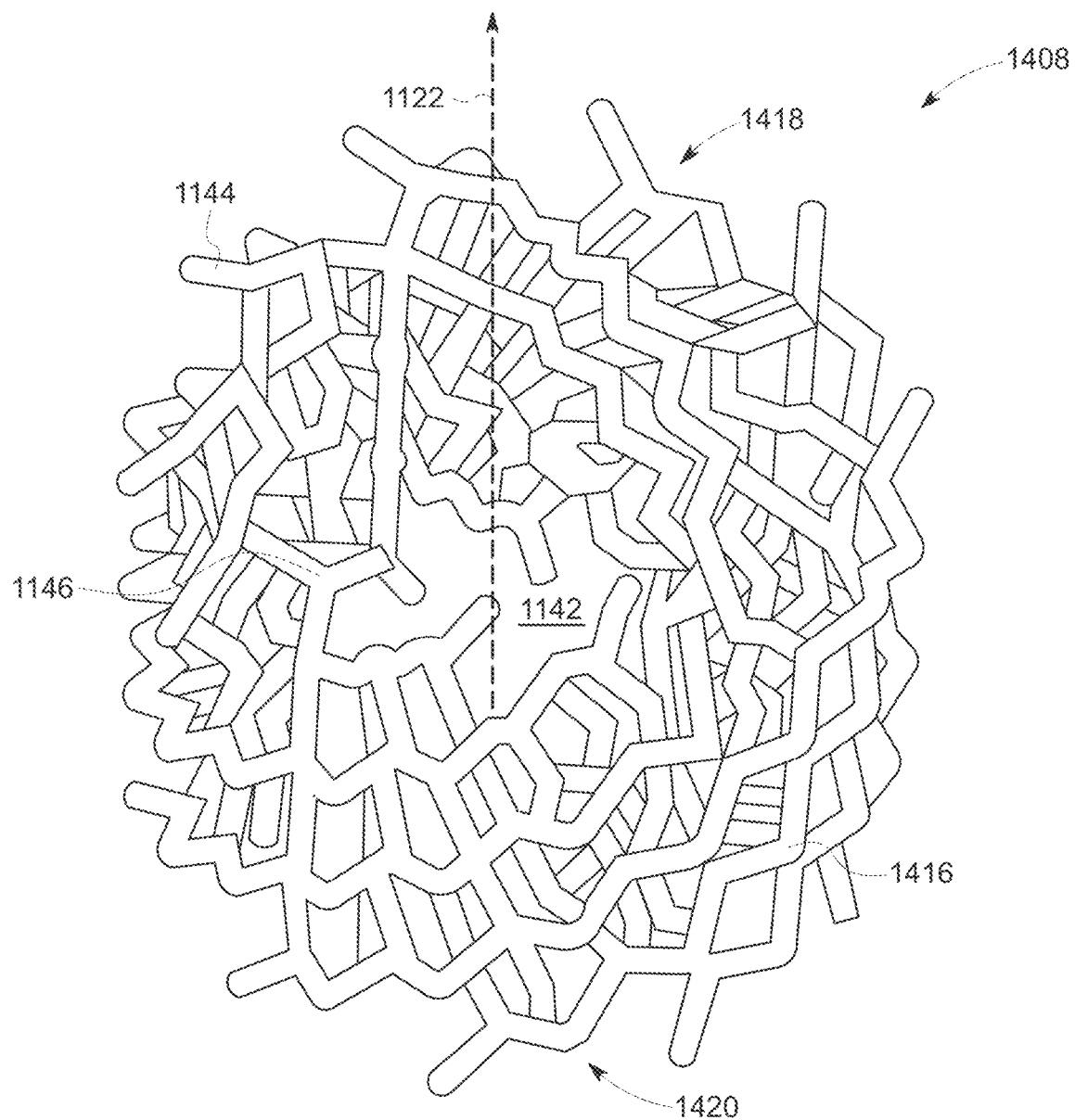
FIG. 13 illustrates another example of a fractal lattice resistor.

FIG. 9 illustrates another example of resistors 1008. Two resistors are shown in FIG. 9, with one resistor being partially cut-away so that the interior of the resistor is visible. The resistor is formed from an elongated body 1016 that extends from a first terminal end 1018 to an opposite terminal end 1020.

In contrast to the bodies of the resistors shown in FIGS. 1 through 8, the body forms a cylinder-shaped resistor that is elongated along and extends around a center axis 1022. The body includes several spatial gaps, channels, apertures or holes 1040 through the body in different locations along the length of the body from the first terminal end to the opposite end 1020. In the illustrated embodiment, the holes are slots that are elongated in circumferential directions that extend around the center axis 1022. Optionally, one or more of the holes may be elongated in axial directions that are parallel to the center axis 1022 or in another direction. In another embodiment, one or more of the holes are not elongated. The holes may provide thermal management, such as cooling.

The body extends around and defines an interior channel, passage, or conduit 1042. The resistor can be oriented so that the cooling fluid is directed into the interior channel along the center axis 1022. For example, the body can be positioned so that the center axis 1022 is oriented along or parallel to a direction oriented toward one of the blowers. In other embodiments, the body can be positioned to that the center axis 1022 is oriented in a direction that is orthogonal to (e.g., that points toward) the blower that directs the cooling fluid toward the body.

The interior channel 1042 and/or holes allow for the passage of cooling fluid through the body and to contact increased amounts of the surface area of the body. For example, in contrast to a planar solid plate resistor, the cylinder-shaped resistor can have the interior surfaces of the channel 1042, the portions of the body that extend around the holes, and/or the exterior surface of the body contact the cooling fluid. This can increase the amount of surface area per unit length of the resistor that contacts and is cooled by the fluid relative to a flat plate resistor.

FIGS. 10 through 13 illustrate additional examples of resistors 1108, 1208, 1308, 1408. The resistors are formed from elongated bodies 1116, 1216, 1316, 1416 that extend from first terminal ends 1118, 1218, 1318, 1418 to corresponding opposite terminal ends 1120, 1220, 1320, 1420.

The bodies provide cylinder-shaper resistors that are elongated along and extends around center axes 1122. The bodies are formed from several elongated bars or members 1144 that are joined together at nodes 1146 in lattice structures. The lattice structures include the elongated members joined at the nodes but otherwise separated and spaced apart from each other. Additionally, the arrangement of the elongated members and nodes 1146 in the lattice structures of the resistors differ from each other. The separation between the elongated members provides volume through which the cooling fluid can flow through the resistors to contact increased amounts of surface area per unit volume of the resistors relative to other resistors (e.g., currently used planar plate resistors).

The lattice structures are three-dimensional structures with the members being elongated in different directions in a three-dimensional space. The lattice structures shown in FIGS. 10 through 13 are different types fractal structures. The members and nodes may be arranged in a regular repeating pattern along the length of each of the resistors. The lattice structures extend around or encircle a center axis 1122 of the resistors such that an interior channel 1142 of each of the resistors is defined at least in part by each of the lattice structures.

The resistors can be oriented so that the cooling fluid is directed into the interior channels along the center axes. For example, the bodies can be positioned so that the center axes are oriented along or parallel to a direction oriented toward one of the blowers. In other embodiments, the bodies can be positioned to that the center axes are oriented in a direction that is orthogonal to (e.g., that points toward) the blower that directs the cooling fluid toward the bodies.

FIG. 14 illustrates another example of a resistor 1508. FIG. 15 illustrates a cross-sectional view of the resistor along line 15-15 in FIG. 14. The resistor is formed from a porous, elongated body 1516 that extends from a first terminal end 1518 to a second terminal end 1520 that is opposite the first terminal end.

The body is shaped to provide a cylinder-shaped resistor 1508 that is elongated along a center axis 1522. The body is porous. For example, the body includes a porous matrix 1517 that defines a network of pores 1519 through the body. At least some of the pores are interconnected such that the cooling fluid can pass through the body via the pores. The porous matrix may include (or be composed of) a ceramic material that is at least partially electrically conductive and at least partially electrically resistive to resist conduction of electric current through the body between the first and second terminal ends. The porous matrix may define the network of pores to have irregular shapes, irregular spacing, and the like, as opposed to a lattice structure and fractal structures that have more consistent and repeatable features. The pores may be a byproduct of the material composition of the matrix and/or the process of manufacturing the body. In an embodiment, at least some of the pores are exposed along a cylindrical outer surface 1521 of the body. The cylindrical outer surface extends from the first terminal end to the second terminal end. The pores located along the cylindrical outer surface can receive cooling fluid into the body and emit cooling fluid out of the body at locations between the terminal ends for enhanced heat dissipation.

In contrast to one or more other resistors shown herein, the body is not open or does not form an open channel through which the center axis 1522 extends. For example, the porous matrix continuously extends along an entire cross-sectional surface area of the elongated body along a plane that is perpendicular to the center axis. As such, the elongated body is not tube-shaped with a hollow channel through a central region of the porous matrix. In an embodiment, the body includes a conical tip 1523 at the second terminal end 1520. The conical tip is coupled to an end 1524 of the porous matrix. The conical tip is not porous in the illustrated embodiment.

The body can be a multi-part body formed from an elongated inner or center portion 1548 and at least an elongated outer or outward portion 1550. The inner or center portion is closer to the center axis 1522 than the outer portion with the outer portion being radially outward of the center portion from the center axis 1522. The porous matrix is disposed in both the center portion and the outer portion. While only a single outer portion is shown in FIG. 14, in other embodiments, the body can include multiple outer portions located at different radial distances from a center axis.

The different portions of the body can have different pore characteristics relative to each other. For example, the pores of the porous matrix in the center portion may have a different pore density, pore size, number of pores, and/or relative proximity to one another as compared to the pores of the porous matrix in the outer portion. In an embodiment, the outer portion may have smaller pores, fewer pores, and/or a reduced pore density than the center portion. The reduced pore density (or the increased body density) in the outer portion can cause more surface area of the body to come into contact with the cooling fluid than the inner portion. This can allow the outer portion of the body to cool more rapidly while permitting the cooling fluid to continue passing into and through the inner portion of the body.

In one embodiment, the body is a lattice structure having the volumes between the elongated members and the nodes create the pores. The lattice structure of the outer portion can have the elongated members and nodes closer together than the inner portion to provide for a reduced pore density in the outer portion.

The body can be oriented so that the center axis 1522 is oriented along or parallel to a direction oriented toward one of the blowers. In other embodiments, the bodies can be positioned to that the center axes 1122 are oriented in a direction that is orthogonal to (e.g., that points toward) the blower that directs the cooling fluid toward the bodies. The cooling fluid can pass through or into the pores of the body to cool the body from inside the body.

Figure 16:
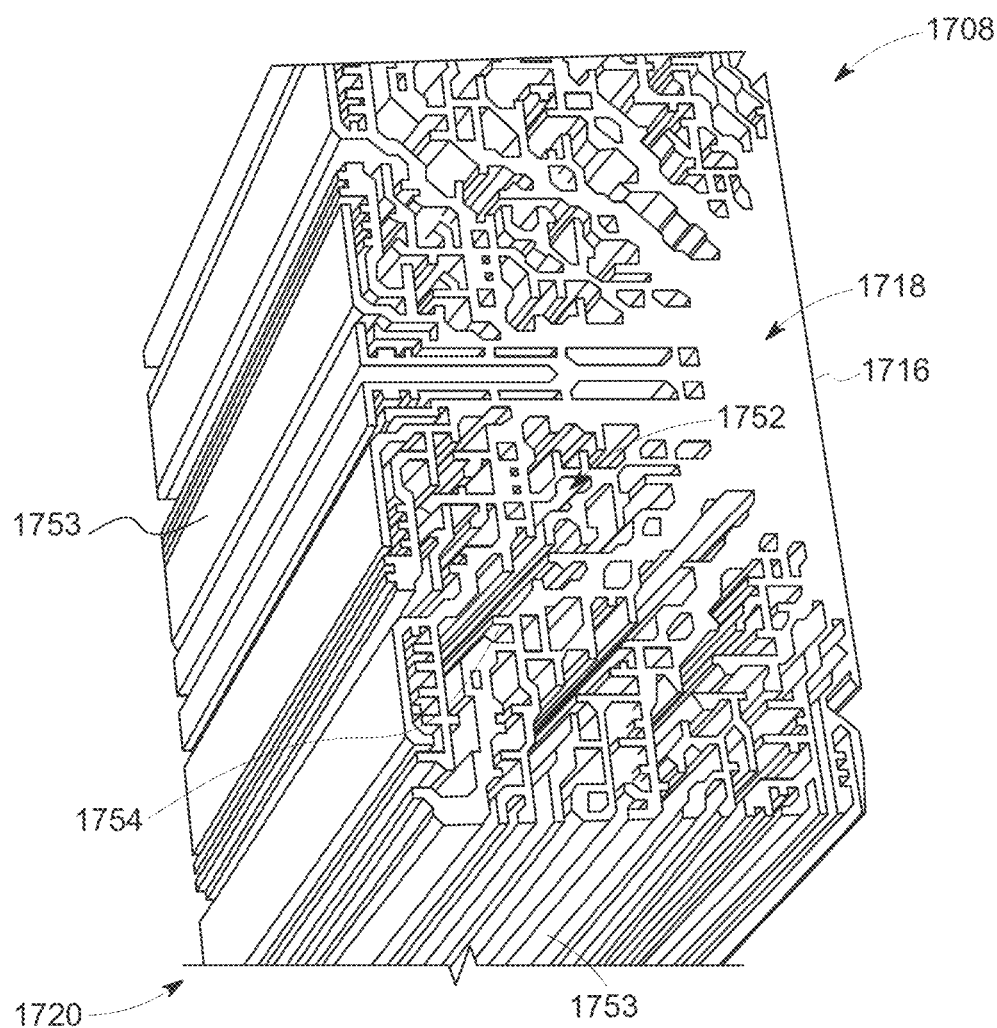
FIG. 16 illustrates a cross-sectional view of a cubic resistor.

FIG. 16 illustrates another example of a resistor 1708. The resistor is formed from a porous, elongated body that extends from a first terminal end 1718 to an opposite terminal end 1720.

The elongated body has a parallelepiped shape, such as a rectangular prism or cuboid. The elongated body defines one or more channels 1752 that extend through the length of the body from the first terminal end to the second terminal end. These channels are open at both of the ends and can provide passages for cooling fluid to flow through the elongated body. The channels may be oriented parallel to each other. For example, each channel may be parallel to a length axis or center axis of the body, which extends from the first terminal end to the second terminal end. In an embodiment, the channels may be discrete and fluidly disconnected from each other along the length of the elongated body.

The portions of the body between the channels 1752 may include fins or elongations 1754 extending into the channels. The portions between the channels may have a fractal shape with straight edges and surfaces that connect at corners that define approximately right angles. Optionally, at least some of the channels are exposed along an outer surface 1753 of the elongated body. The outer surface extends from the first terminal end to the second terminal end. The body may include multiple outer surfaces that extend between the terminal ends, and the channels may be exposed on some or all of the outer surfaces. The length of the channels and/or the presence of the elongations 1754 into the channels can increase the surface area of the body that is exposed to the cooling fluid (relative to shorter channels, no channels, or having no elongations). The body can be oriented so that the channels are elongated along directions that point toward one of the blowers. The cooling fluid can pass through the channels to cool the body from inside the body.

Figure 17:
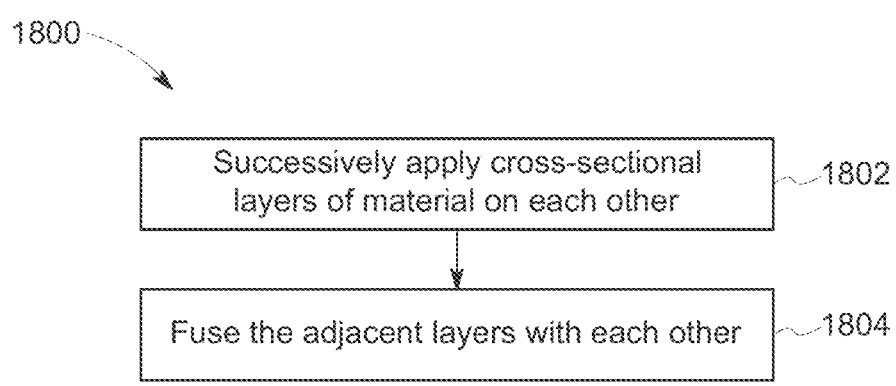
FIG. 17 illustrates a flowchart of one embodiment of a method for additively manufacturing a resistor of a powered system.

FIG. 17 illustrates a flowchart of one embodiment of a method 1800 for additively manufacturing a resistor of a powered system. The method can be used to create one or more of the resistors described herein. At step 1802, multiple layers of material are applied onto each other. Each of these layers forms a cross-section of the resistor being formed. At step 1804, adjacent layers are fused together. These layers can be fused as the layers are applied. For example, subsequent to or while a new layer is applied onto a previously applied layer, the new and previously applied layers can be fused together. The layers can be fused together using one or more sources of energy, such as laser light. The fused layers form the body of the three-dimensional resistor, which can have cooling channels, holes, or the like, and which can have a three-dimensional shape, as described herein.

Figure 18:
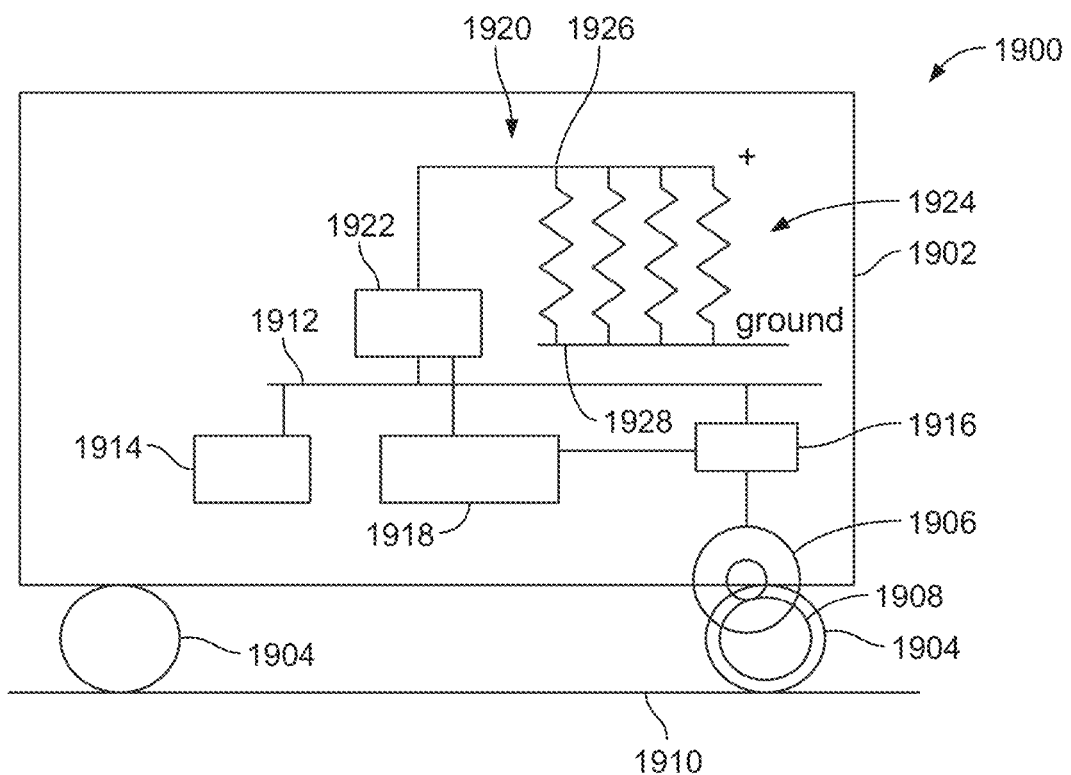
FIG. 18 is a schematic view of a vehicle with a braking system.

In another embodiment, with reference to FIG. 18, a vehicle 1900 (e.g., locomotive) or other powered system (e.g., generator) includes a chassis or other support frame or platform 1902, wheels 1904 (or wheel/axle pairs), and one or more traction motors 1906, at least one of which is connected to one of the wheels by a gear set 1908 (for example). Operation of the motor causes the wheel to rotate for moving the vehicle along a route 1910. The vehicle further includes an electrical power traction system having a DC bus 1912, a source of electrical power 1914 (e.g., a fuel engine that drives an alternator, and/or an energy storage device), at least one inverter 1916 (e.g., there may be one or more inverters per traction motor), a controller 1918, and a dynamic braking dissipation system 1920. The inverter may convert DC electrical power that is present on the DC bus to an electrical waveform that is suitable for powering the motor, e.g., the inverter may convert DC to 3-phase AC for electrically powering an AC traction motor. For doing so, the inverter may be controlled by the controller, that is, the controller may generate switching control signals for switching solid-state power elements (e.g., transistors) of the inverter on and off, to convert the DC to another power waveform. The electrical power traction system may be useful for a dynamic or regenerative braking mode of operation, wherein the inverter and/or motor are controlled for the motor to act as a generator. In such a mode of operation, the motor provides resistance to the wheel/axle, thereby slowing the vehicle. In turn, the motor generates electricity. The generated electricity may be routed back to the DC bus, or it is otherwise passed to the dynamic braking dissipation system. (In the case of regenerative braking, some portion of the generated electrical power is instead used to charge one or more energy storage device.) The dynamic braking dissipation system may include a chopper or other controlled inverter or switch 1922 (which is controlled by the controller), and also includes an array or grid of resistor elements 1924. The resistor elements are electrically connected (in series and/or in parallel) between an output of the chopper and electrical ground. The resistor elements may dissipate electrical power as heat, which is expelled from the vehicle using a blower or other cooling element or system. Thus, when the system generates electrical power during dynamic braking, the dynamic braking dissipation system dissipates the electrical power as waste heat, to the extent the system does not otherwise utilize the dynamic braking power for running onboard loads, charging energy storage devices, or otherwise.

In an embodiment, in the vehicle or other powered system, one or more of the resistor elements each respectively comprises an elongated body that extends from a first terminal end 1926 to an opposite second terminal end 1928, the body forming a continuous, non-intersecting path (e.g., a serpentine path) that extends from the first terminal end to the second terminal end and that forms a disc. The body may receive electric current from the vehicle at the first terminal end and conduct and provide electric resistance to the electric current received from the vehicle to dissipate at least part of the electric current as heat from the body. The second terminal end of the body may be coupled with at least one other resistor of the vehicle in one or more of a parallel or series arrangement in an electric circuit. The body may be an additively manufactured body.

In an embodiment, in the vehicle or other powered system, one or more of the resistor elements each respectively comprises an elongated cylindrical body having nodes and elongated members. The elongated members interconnect the nodes to form a lattice structure having openings between the nodes and the elongated members. The system may flow a cooling fluid (e.g., air or liquid) through the openings. The body may receive electric current from the vehicle and to conduct and provide electric resistance to the electric current received from the vehicle to dissipate at least part of the electric current as heat from the body. The body also may be coupled with at least one other resistor of the vehicle in one or more of a parallel or series arrangement in an electric circuit. The body may be an additively manufactured body. (Also, alternatively or additionally, the resistor element/elements may be further configured as described elsewhere herein and as shown in the drawings.)

Figure 19:
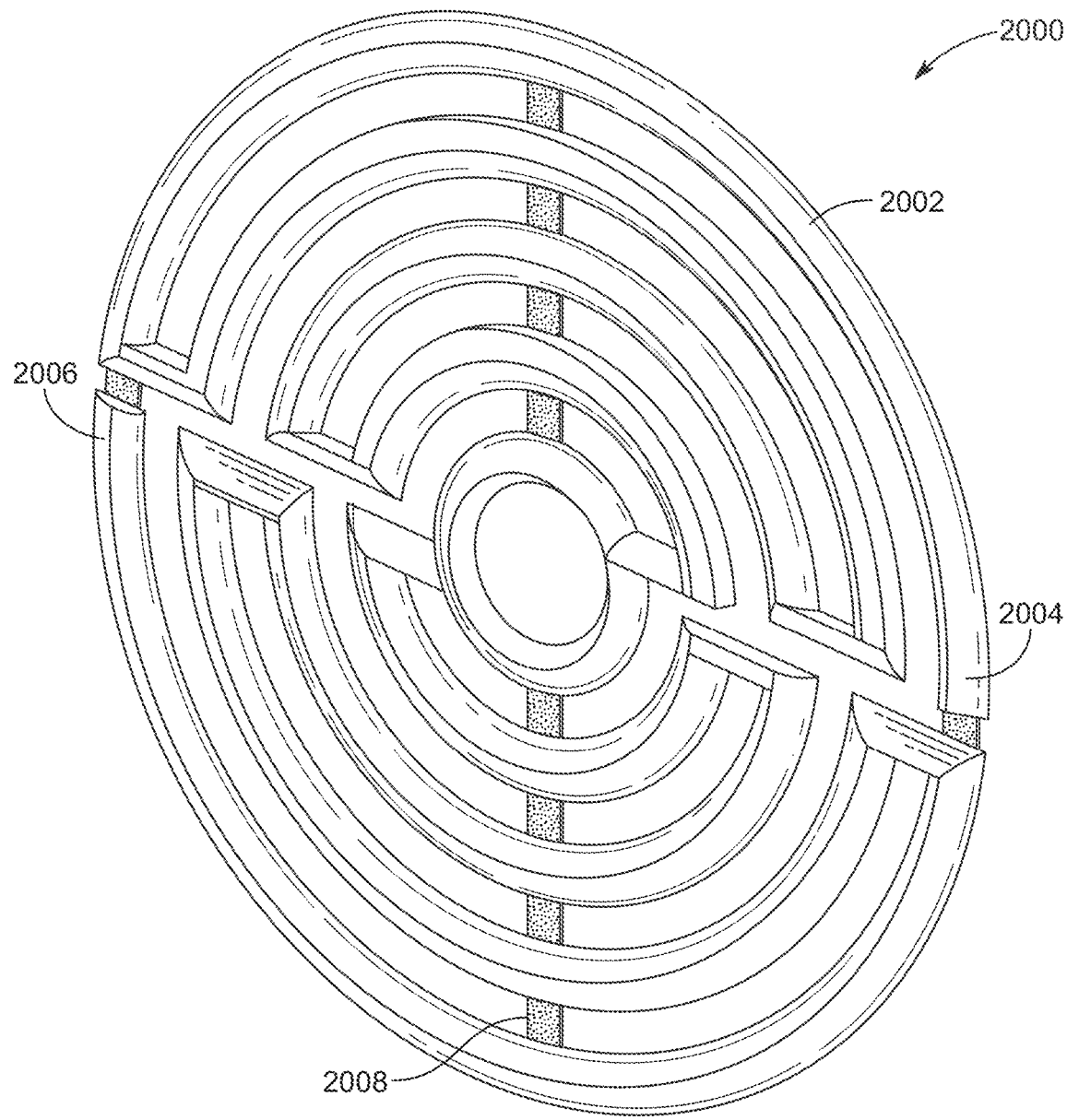
FIG. 19 and FIG. 20 illustrate other embodiments of resistors.

In an embodiment, with reference to FIG. 19, a resistor 2000 includes an elongated body 2002 that extends from a first terminal end 2004 to an opposite second terminal end 2006. The body forms a continuous, non-intersecting path that extends from the first terminal end to the second terminal end and that forms a disc. The body may receive electric current from a powered system at the first terminal end and conduct and provide electric resistance to the electric current received from the powered system to dissipate at least part of the electric current as heat from the body. The resistor may include insulative (non-electrically conducting) support members 2008 that intersect with and are attached to the conductive body. The support members do not conduct electricity, such that the conductive body, winding in a tortuous or serpentine manner, extends from one terminal to the other without the arms or winding portions of the body intersecting with other arms or winding portions of the body. In one aspect, the support members and the body are made using an additive manufacturing process (e.g., different materials for the support members and body), and are thereby unitary. The support members may be thermally conductive, thereby to help remove heat from the body.

Figure 20:
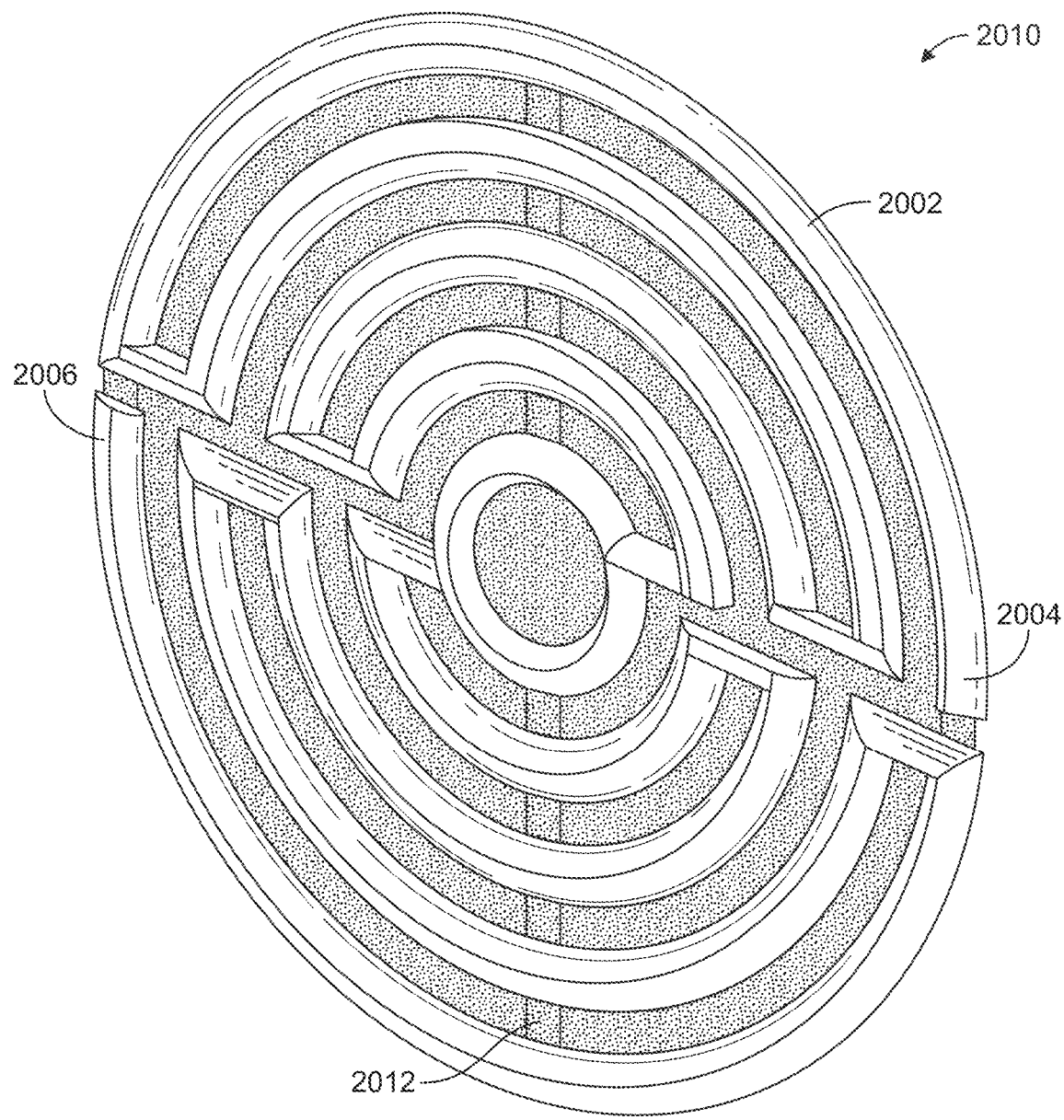

In an embodiment, with reference to FIG. 20, a resistor 2010 includes an elongated body 2002 that extends from a first terminal end 2004 to an opposite second terminal end 2006. The body forms a continuous, non-intersecting path that extends from the first terminal end to the second terminal end and that forms a disc. The body may receive electric current from a powered system at the first terminal end and conduct and provide electric resistance to the electric current received from the powered system to dissipate at least part of the electric current as heat from the body. The resistor may include one or more insulative (non-electrically conducting) portions 2012 that are attached to and lie between the arms or winding parts of the body. The insulative portion(s) do not conduct electricity, such that the body, winding in a tortuous or serpentine manner, extends from one terminal to the other without the arms or winding portions of the body intersecting with other arms or winding portions of the body. In one aspect, the insulative portion(s) and the body are made using an additive manufacturing process (e.g., different materials for the insulative portion(s) and electrically-conductive portion) and are thereby unitary. The insulative portion(s) may be thermally conductive, thereby to help remove heat from the conductive body. The insulative portion(s) may occupy the entirety of the space/spaces between the arms or windings of the body, such that the resistor disc is a solid disc, or solid except for through-holes provided for the passage of a cooling fluid.

Figure 21:
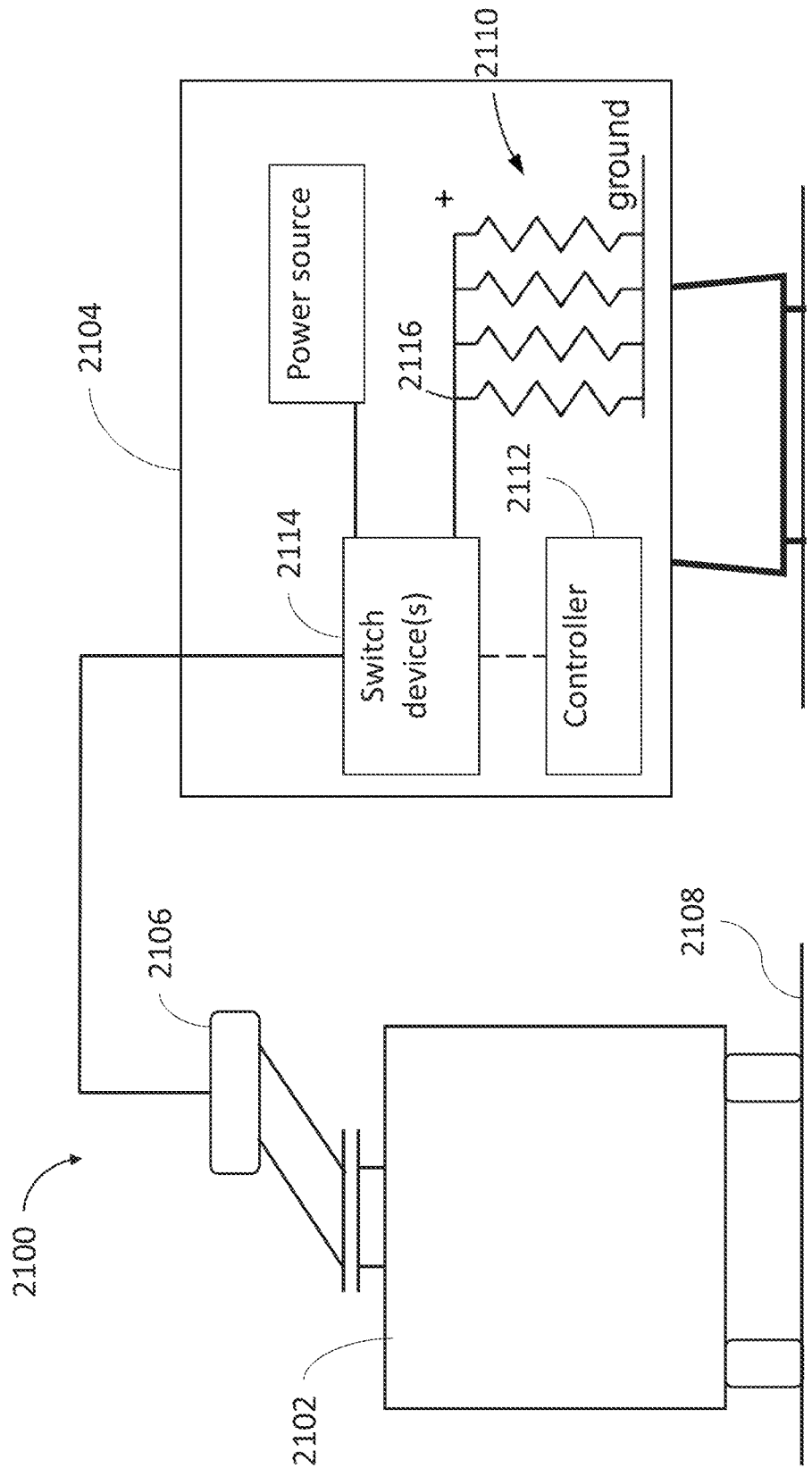
FIG. 21 illustrates a power transfer system according to an embodiment.

FIG. 21 illustrates a power transfer system 2100 according to an embodiment. The power transfer system includes a vehicle 2102 and a power system 2104. In an embodiment, the power system is off-board the vehicle (e.g., is an off-board power system). The power system is separate and discrete from the vehicle, such that the power system does not travel with the vehicle. The vehicle travels on a route 2108. The vehicle in one example is a bus that travels on a road which represents the route. In a second example, the vehicle is a locomotive or other propulsion-generating rail vehicle that travels on a track which represents the route. The power system may be a stationary structure (e.g., monument) located along a side of the route. The vehicle moves relative to the power system as the vehicle travels along the route. The power system may be mounted on a platform, fixed to the ground, or the like. The vehicle is electrically connected to the power system via an electrical intermediary device 2106. The electrical intermediary device (referred to herein simply as intermediary device) may be a catenary line or other power cable, a third rail (in a rail-based vehicle embodiment), a pantograph, or the like.

The power system includes a power source, such as access to an electrical grid or network, one or more batteries, or the like. The power system and the vehicle can convey electrical energy to one another via the intermediary device. For example, the power system can supply electrical energy to the vehicle to power propulsion (and general operations such as lighting, HVAC, computing devices, etc.) of the vehicle. Furthermore, during regenerative braking, at least some of the electrical energy generated by the traction motors of the vehicle can be supplied to the power system for storage, supplementing the electrical grid or network, or dissipation as heat. For example, the vehicle may include an electrical power traction system configured for a regenerative (or dynamic) braking mode of operation, similar to the electrical power traction system of the vehicle shown in FIG. 18. In the illustrated embodiment, at least some of the electric current generated by a motor (or multiple motors) onboard the vehicle while the vehicle applies regenerative braking as the vehicle travels on the route is directed to the power system via the intermediary device. The power source may be a connection interface and electronics for receiving electrical power from the electrical grid or network. In other embodiments, or in addition, the power source may include one or more batteries, capacitors, or the like.

In addition to the power source, the power system may include a resistor grid or array 2110, a controller 2112, one or more switch devices 2114, and associated circuitry for electrically connecting the components. The resistor grid includes multiple resistors 2116 electrically connected to each other in a circuit. The resistors may be electrically connected in series or in parallel arrangements between the one or more switch devices and electrical ground. For example, a first terminal end of one resistor may be directly electrically connected to a switch device, and a second terminal end of the same resistor may be directly electrically connected to a first terminal end of another resistor in the circuit. In other embodiments, the second terminal end may be directly electrically connected to the electrical ground. The resistors are formed and designed to be least partially electrically conductive and at least partially electrically resistive to resist conduction of electric current and dissipate electric current as heat. The resistors in the resistor grid may be any of the resistors described herein. For example, a first resistor in the resistor grid may be one of the elongated resistors shown in FIGS. 9 through 16. In another example, the first resistor (or a second resistor in the grid) may be one of the disc-shaped resistors shown in FIGS. 1 through 8, 19, and 20.

The controller represents hardware circuitry that includes and/or is connected with one or more processors (e.g., one or more microprocessors, integrated circuits, microcontrollers, field programmable gate arrays, etc.). The controller includes and/or is connected with a tangible and non-transitory computer-readable storage medium (e.g., memory device). The memory device may store programmed instructions (e.g., software) that is executed by the one or more processors to perform the operations of the controller described herein.

The controller of the power system permits the transfer of power between the vehicle and the power system. In an embodiment, the controller permits power transfer from the vehicle that is traveling on the route to the power system via the intermediary device. At least some of the power that is transferred may be electrical energy generated by traction motor(s) of the vehicle during regenerative braking. The controller is operably connected to the one or more switch devices via at least one wired or wireless communication pathway. The controller may control the power transfer by actuating the one or more switch devices to selectively establish a close conducting pathway from the intermediary device to the power source (e.g., the energy storage device) and/or the resistor grid. For example, the controller may generate a first set of control signals to actuate the one or more switching devices in a first configuration to enable the transfer of electric current from the intermediary device to the power source only (without transferring electric current to the resistor grid). The controller may generate a second set of control signals to actuate the switching device(s) in a second configuration to enable the transfer of electric current from the intermediary device to both the power source and the resistor grid during a common time period (e.g., concurrently). The controller may generate a third set of control signals to actuate the switching device(s) in a third configuration to enable the transfer of electric current from the intermediary device to the resistor grid only (without transferring electric current to the power source).

The switch devices may be a type of electrical switch that is selected based on desired power transfer rates and amounts (e.g., currents and voltages). Optionally, one or more of the switch devices may be an electromechanical switch, such as a contactors and/or a relay. Optionally, one or more of the switch devices may be a solid state switch, such as a solid state relay, an insulated-gate bipolar transistor (IGBT), a metal oxide semiconductor field effect transistors (MOSFET), or the like.

The controller may control the one or more switch devices to direct an excess portion of electric current received from the intermediary device to the resistor grid for the multiple resistors to dissipate the excess portion of the electric current as heat. In an embodiment, the excess portion of the electric current represents an amount or rate of electrical energy that exceeds a capability of the power source (or other circuitry) of the power system to handle and distribute the electrical energy.

For example, the capability of the power source may represent an available capacity of an energy storage device, indicating an amount of electrical energy that the energy storage device can absorb and store before reaching a designated maximum charge state. If the amount of electric current generated by the vehicle during regenerative braking and supplied to the power system exceeds the available capacity of the energy storage device, the controller may supply the amount of electric current that exceeds the available capacity (e.g., the excess amount) to the resistor grid. The controller may determine the available capacity of the energy storage device based on one or more voltage or current sensors that monitor a charge state of the energy storage device. The controller may determine that the energy storage device has no available capacity if the energy storage device is charged to the designated maximum charge state or the energy storage device is at a fail state. Upon receiving the electric current from the intermediary device, if the controller determines that the energy storage device has available capacity, then the controller may generate the first set of control signals to actuate the one or more switching devices in the first configuration. The first configuration directs the electric current to the power source only. Upon determining that that energy storage device is at or close to the designated maximum charge state, while continuing to receive the electric current from the intermediary device, the controller may generate the third set of control signals to actuate the switching device(s) in the third configuration to direct the excess portion of the electric current to the resistor grid only for dissipation as waste heat. This control scheme ensures that the vehicle is not limited in the amount of electric current that can be supplied to the power system. As such, the vehicle can use regenerative braking to come to a complete stop. Even if the power source of the power system cannot handle the full amount of electric current generated by the vehicle during the regenerative braking, the excess electric current is dissipated as heat by the resistor grid of the power system.

In another example, the capability of the power source may represent an upper limit charge rate for charging the energy storage device, supplying current to the electrical grid or network, or the like. The controller may utilize one or more current sensors to monitor the rate at which the electric current is conveyed to the power system by the intermediary device. If the rate does not exceed the designated upper limit, then the controller may generate the first set of control signals to actuate the one or more switching devices in the first configuration in which all of the transferred electric current is directed to the power source (e.g., the energy storage device, electrical grid, etc.). If the rate from the vehicle does exceed the designated upper limit, then the controller may generate the second set of control signals to actuate the switching device(s) in the second configuration. In the second configuration, a first portion of the electric current is transferred to the power source and a second portion (e.g., the excess portion) of the electric current is transferred to the resistor grid during a common time period. The first portion of the electric current that is transferred to the power source may be modified such that the rate of current transfer is less than the designated upper limit for safe handling by the power source. This control scheme ensures that the vehicle is not limited in the rate of electric current transfer to the power system. The controller may distribute the electric current that is received so as to not exceed designated limits and constraints of the power source and other components that utilize the electric current for functions other than simply dissipating the current as waste heat. The controller may be configured to utilized both of the control schemes described in the two examples above, either sequentially or concurrently, depending on characteristics of the electric current received from the vehicle via the intermediary device.

In one embodiment, a resistor of a vehicle or other powered system is provided. The resistor includes an elongated cylindrical body having nodes and elongated members. The elongated members interconnect the nodes to form openings between the nodes and the elongated members for the flow therethrough of a cooling fluid. The body may receive electric current from a powered system and to conduct and provide electric resistance to the electric current to dissipate at least part of the electric current as heat from the body. The body also may be coupled with at least one other resistor of the powered system in one or more of a parallel or series arrangement in an electric circuit.

Optionally, the body is a fractal structure defined by the elongated members and the nodes. Optionally, the body is a tube defined by the elongated members and the nodes. The tube has an open interior channel, and the openings between the nodes and the elongated members are fluidly connected to the interior channel. The body may include multiple rows of the openings along a length of the cylindrical body, with each of the rows including multiple of the openings spaced apart around a circumference of the cylindrical body. The body may extend along a center axis from a first terminal end of the body to an opposite second terminal end of the body. The first terminal end may receive the electric current, and the second terminal end may be coupled with the at least one other resistor. Optionally, the elongated members and the nodes form a lattice structure with the elongated members being elongated in multiple different directions in a three-dimensional space. The openings defined between the elongated members and the nodes may be interconnected to enable the cooling fluid to flow through the body via the openings to dissipate the heat from the body. The body may include a ceramic material and/or a metallic material. The powered system, the resistor, and the at least one other resistor may be disposed on a vehicle.

Optionally, the body has an elongated center portion and an elongated outer portion disposed radially outside of the center portion relative to a center axis of the body and surrounding the center portion. The center portion of the body has a different density of the nodes and the elongated members than the outer portion of the body. The elongated members and the nodes of the outer portion are closer together than the elongated members and the nodes of the center portion such that the openings in the outer portion are smaller than the openings in the center portion.

In one embodiment, a method for manufacturing a resistor includes successively applying layers of material on each other. Each of the layers forms a cross-sectional shape of a three-dimensional resistor body. The method also includes fusing adjacent layers of the layers that are successively applied with each other to form the resistor body. The adjacent layers are fused together to form the resistor body that has an elongated cylindrical shape. The adjacent layers are fused together to form the resistor body that is shaped to receive and dissipate electric current from a powered system as heat from the resistor body. The resistor body is shaped to be coupled with at least one other resistor of the powered system in one or more of a parallel or series arrangement in an electric circuit.

Optionally, the layers are successively applied and the adjacent layers are fused together to form the resistor body having define multiple elongated members and nodes. The elongated members interconnect the nodes to form openings therebetween for the flow therethrough of a cooling fluid. The layers may be successively applied and the adjacent layers fused together to form the resistor body as a fractal structure defined by the elongated members and the nodes. The layers may be successively applied and the adjacent layers fused together to form the resistor body having an open interior channel. The openings between the nodes and the elongated members are fluidly connected to the interior channel.

Optionally, the layers are successively applied and the adjacent layers are fused together to form the resistor body as a tube defining an interior channel that extends an entire length of the cylindrical resistor body. A center axis of the cylindrical resistor body extends through the interior channel. Optionally, the layers are successively applied and the adjacent layers are fused together to form the resistor body with an elongated center portion and an elongated outer portion disposed radially outside of the center portion relative to a center axis of the body and surrounding the center portion.

In one embodiment, a resistor includes an elongated cylindrical body that extends along a center axis from a first terminal end to an opposite, second terminal end. The body has elongated members interconnected to one another at nodes and forms openings between the nodes and the elongated members for flow therethrough of a cooling fluid. The body forms a continuous electrically conductive path that extends from the first terminal end to the second terminal end. The body may receive electric current at the first terminal end from a powered system and to conduct and provide electric resistance to the electric current to dissipate at least part of the electric current as heat from the body. The second terminal end of the body may be coupled with at least one other resistor of the powered system in one or more of a parallel or series arrangement in an electric circuit. Optionally, the body defines an interior channel extending from the first terminal end to the second terminal end and the center axis extends through the interior channel. The openings between the nodes and the elongated members are fluidly connected to the interior channel.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A power system comprising:
    a power source electrically connected to an electrical intermediary device via one or more switch devices, the electrical intermediary device configured to convey electric current generated by a vehicle on a route as the vehicle travels along the route;
    a resistor grid electrically connected to the electrical intermediary device via the one or more switch devices, the resistor grid comprising multiple resistors electrically connected to each other in a circuit, at least a first resistor of the multiple resistors including a body that extends along a center axis of the body from a first terminal end of the body to a second terminal end of the body, the body including a porous matrix that defines a network of pores, at least some of the pores in the network being interconnected and configured to receive flow therethrough of a cooling fluid, the porous matrix continuously extending along an entire cross-sectional surface area of the body perpendicular to the center axis; and
    a controller operably connected to the one or more switch devices and configured to control the one or more switch devices to direct an excess portion of the electric current received from the electrical intermediary device to the resistor grid for the multiple resistors to dissipate the excess portion of the electric current as heat.

2. The power system of claim 1, wherein the body of the first resistor has an elongated cylindrical shape that extends along the center axis from the first terminal end to the second terminal end.

3. The power system of claim 1, wherein the controller is configured to determine an available capacity of the power source, and the excess portion of the electric current represents electric current that is generated by a vehicle and received from the electrical intermediary device which exceeds the available capacity of the power source.

4. The power system of claim 1, wherein the electrical intermediary device is one of a third rail, a catenary line, or a pantograph.

5. The power system of claim 1, wherein the controller is configured to control the one or more switch devices to direct another portion of the electric current received from the electrical intermediary device to the power source.

6. A resistor comprising:
    an elongated body that extends along a center axis of the elongated body from a first terminal end of the elongated body to a second terminal end of the elongated body, the elongated body including a porous matrix that defines a network of pores, at least some of the pores in the network being interconnected and configured to receive flow therethrough of a cooling fluid, the porous matrix continuously extending along an entire cross-sectional surface area of the elongated body perpendicular to the center axis,
    the elongated body configured to receive electric current from a powered system and to conduct and provide electric resistance to the electric current to dissipate at least part of the electric current as heat from the elongated body.

7. The resistor of claim 6, wherein the elongated body is cylindrical and at least some of the pores are exposed along a cylindrical outer surface of the elongated body.

8. The resistor of claim 6, wherein the elongated body includes a conical tip at the second terminal end, the conical tip coupled to an end of the porous matrix.

9. The resistor of claim 6, wherein the elongated body has a center portion, through which the center axis extends, and an outer portion disposed radially outside of the center portion and surrounding the center portion, wherein the pores of the porous matrix in the center portion have at least one of a different pore density, pore size, number of pores, or relative proximity to one another as compared to the pores of the porous matrix in the outer portion.

10. The resistor of claim 9, wherein the outer portion has at least one of smaller pores, fewer pores, or a reduced pore density than the center portion.

11. The resistor of claim 6, wherein the porous matrix comprises a ceramic material that is at least partially conductive and at least partially resists conduction of electric current.

12. A resistor comprising:
an elongated body that extends along a center axis of the elongated body from a first terminal end of the elongated body to a second terminal end of the elongated body, the elongated body including a center portion, through which the center axis extends, and an outer portion radially outside of the center portion and surrounding the center portion,
the elongated body including a porous matrix that defines a network of pores, the porous matrix disposed in both the center portion and the outer portion, at least some of the pores in the network being interconnected and configured to receive flow therethrough of a cooling fluid, wherein first pores in the network located within the center portion have at least one of a different pore density, pore size, number of pores, or relative proximity to one another than second pores in the network located within the outer portion,
the elongated body configured to receive electric current from a powered system and to conduct and provide electric resistance to the electric current to dissipate at least part of the electric current as heat from the elongated body.

13. The power system of claim 2, wherein at least some of the pores are exposed along a cylindrical outer surface of the body of the first resistor.

14. The power system of claim 1, wherein the body of the first resistor includes a conical tip at the second terminal end.

15. The power system of claim 1, wherein the body of the first resistor has a center portion, through which the center axis extends, and an outer portion disposed radially outside of the center portion and surrounding the center portion, wherein the pores of the porous matrix in the center portion have at least one of a different pore density, pore size, number of pores, or relative proximity to one another as compared to the pores of the porous matrix in the outer portion.

16. The power system of claim 15, wherein the pores of the porous matrix in the outer portion are at least one of smaller, fewer in number, or more spaced apart from one another than the pores of the porous matrix in the center portion.

17. The power system of claim 1, wherein the porous matrix comprises a ceramic material.

18. The resistor of claim 12, wherein the elongated body is cylindrical and at least some of the pores are exposed along a cylindrical outer surface of the elongated body.

19. The resistor of claim 12, wherein the elongated body includes a conical tip at the second terminal end.

20. The resistor of claim 12, wherein the porous matrix comprises a ceramic material.

* * * * *